(12) United States Patent
Chae et al.

(10) Patent No.: US 11,476,595 B2
(45) Date of Patent: Oct. 18, 2022

(54) POWER CABLE INTERMEDIATE CONNECTION STRUCTURE

(71) Applicant: LS CABLE & SYSTEM LTD., Anyang-si (KR)

(72) Inventors: Byung Ha Chae, Seoul (KR); Chae Hong Kang, Gumi-si (KR); Si Ho Son, Daegu (KR); Seung Myung Choi, Gumi-si (KR); Ho Jung Yun, Seoul (KR); Kuniaki Sakamoto, Gumi-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 0 days.

(21) Appl. No.: 17/291,369

(22) PCT Filed: Oct. 25, 2019

(86) PCT No.: PCT/KR2019/014125
§ 371 (c)(1),
(2) Date: May 5, 2021

(87) PCT Pub. No.: WO2020/096242
PCT Pub. Date: May 14, 2020

(65) Prior Publication Data
US 2022/0006206 A1    Jan. 6, 2022

(30) Foreign Application Priority Data

Nov. 7, 2018  (KR) .......................... 10-2018-0135919
Oct. 23, 2019  (KR) .......................... 10-2019-0131856

(51) Int. Cl.
*H01R 4/18*    (2006.01)
*H01R 4/20*    (2006.01)
(Continued)

(52) U.S. Cl.
CPC .............. *H01R 4/20* (2013.01); *H01B 9/027* (2013.01); *H01R 4/70* (2013.01); *H02G 15/1806* (2013.01)

(58) Field of Classification Search
CPC . H01B 9/027; H01R 4/18; H01R 4/10; H01R 4/20; H01R 4/62; H01R 9/05
See application file for complete search history.

(56) References Cited

U.S. PATENT DOCUMENTS

| | | | | |
|---|---|---|---|---|
| 1,909,344 A | * | 5/1933 | Green | F16G 11/02 403/284 |
| 3,184,535 A | * | 5/1965 | Worthington | H01R 4/20 174/90 |

(Continued)

FOREIGN PATENT DOCUMENTS

| | | |
|---|---|---|
| JP | H07274370 A | 10/1995 |
| JP | H08196026 A | 7/1996 |

(Continued)

OTHER PUBLICATIONS

International Search Report for related International Application No. PCT/KR2019/014125; dated May 14, 2020; (5 pages).

(Continued)

*Primary Examiner* — Chau N Nguyen
(74) *Attorney, Agent, or Firm* — K&L Gates LLP

(57) ABSTRACT

The present disclosure relates to an intermediate connection structure of a power cable, which is capable of reducing heating of a connecting part of conductors of a pair of power cables connected through a joint box, enhancing a connected state of the conductors, and minimizing a diameter of the conductor connection part.

16 Claims, 13 Drawing Sheets

(51) Int. Cl.
    *H01B 9/02*         (2006.01)
    *H01R 4/70*        (2006.01)
    *H02G 15/18*      (2006.01)

(56) References Cited

U.S. PATENT DOCUMENTS

| | | | | |
|---|---|---|---|---|
| 4,035,007 | A * | 7/1977 | Harrison | F16L 13/004 |
| | | | | 285/381.2 |
| 5,231,249 | A * | 7/1993 | Kimura | H02G 15/103 |
| | | | | 174/105 SC |
| 5,499,448 | A * | 3/1996 | Tournier | H01R 4/183 |
| | | | | 29/862 |
| 7,874,881 | B1 * | 1/2011 | Sosa | H01R 4/188 |
| | | | | 439/877 |
| 2006/0102375 | A1 * | 5/2006 | Tamm | H01R 4/20 |
| | | | | 174/84 C |
| 2011/0294350 | A1 * | 12/2011 | Stagi | H01R 4/36 |
| | | | | 439/623 |
| 2012/0318575 | A1 | 12/2012 | Koto | |

FOREIGN PATENT DOCUMENTS

| | | |
|---|---|---|
| JP | H08327846 A | 12/1996 |
| JP | 2010104122 A | 5/2010 |
| KR | 1020140141642 A | 12/2014 |
| KR | 1020170035774 A | 3/2017 |
| KR | 101830030 B1 | 2/2018 |

OTHER PUBLICATIONS

Written Opinion for related International Application No. PCT/KR2019/014125;; dated May 14, 2020; (5 pages).
Extended European Search Report for related European Application No. 19883286.7; dated Jul. 1, 2022; (10 pages).

* cited by examiner

Fig. 22 <Prior Art>
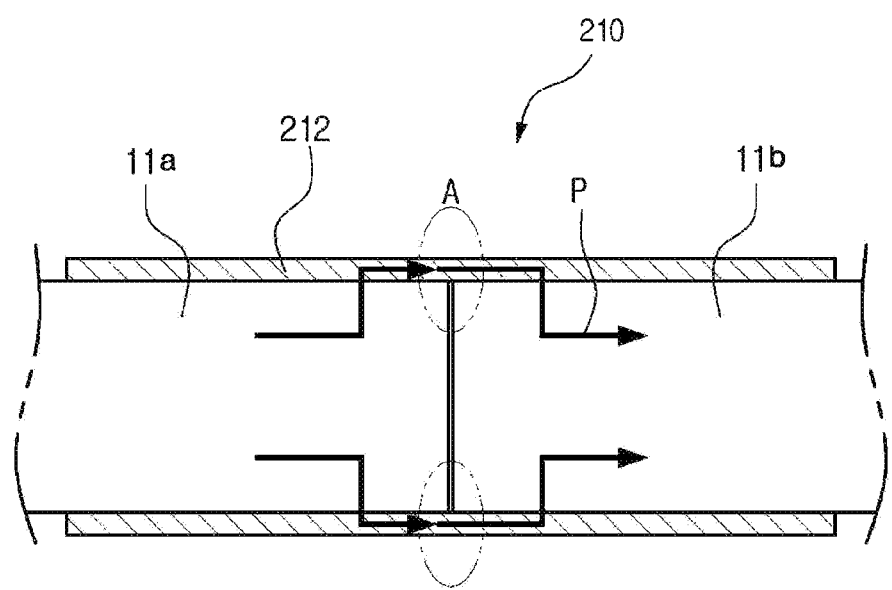

POWER CABLE INTERMEDIATE CONNECTION STRUCTURE

CROSS-REFERENCE TO RELATED APPLICATIONS

The present application is a National Stage of International Application No. PCT/KR2019/014125 filed on Oct. 25, 2019, which claims the benefit of Korean Patent Application No. 10-2018-0135919 filed on Nov. 7, 2018, and Korean Patent Application No. 10-2019-0131856 filed Oct. 23, 2019, filed with the Korean Intellectual Property Office, the entire contents of each hereby incorporated by reference.

FIELD

The present disclosure relates to an intermediate connection structure of a power cable. More specifically, the present disclosure relates to an intermediate connection structure of a power cable, which is capable of reducing heating of a connecting part of conductors of a pair of power cables connected through a joint box, enhancing a connected state of the conductors, and minimizing a diameter of the conductor connection part.

BACKGROUND

Power cables are connected by connecting conductors thereof through a conductor sleeve or the like. The conductor sleeve includes pipe-shaped members, and conductors of a pair of power cables may be connected by inserting the conductors into both ends of the conductor sleeve and compressing an outer circumferential surface of the conductor sleeve.

FIG. 22 is a cross-sectional view of a conductor connection part 210 of a power cable of the related art.

When conductors 11a and 11b of power cables are connected using a conductor sleeve 212, opposite sides of the power cable 100 may be deformed during a process such as compression and thus are likely to be separated from each other, not in surface contact with each other, after the connection of the conductors 11a and 11b.

The conductor sleeve 212 and the conductors 11a and 11b may be compressed to cause outer circumferential surfaces of the conductors 11a and 11b and an inner circumferential surface of the conductor sleeve 212 to be in surface contact with one another, thus forming a current supply path P.

The current supply path P may be provided along the conductor 11a, an outer circumferential surface of the conductor 11a, the inner circumferential surface of the conductor sleeve 212, the conductor sleeve 212, the inner circumferential surface of the conductor sleeve 212, an outer circumferential surface of the conductor 11b, and the conductor 11b.

Therefore, an area of the current supply path P may be determined by a thickness of the conductor sleeve 212 in a region A, which is a boundary area between the conductors 11a and 11b, in the current supply path P of FIG. 22.

However, as shown in FIG. 22, the area of the current supply path P determined by a cross-sectional area or thickness of the conductor sleeve 212 in a region A, which is boundary area between the conductors 11a and 11b, is small compared to the areas of the conductors 11a and 11b, and thus a heating problem may occur.

To prevent this problem, a method of increasing the thickness of the conductor sleeve 212 may be applied, but when the thickness of the conductor sleeve 212 is increased, a thickness of a reinforcing insulating layer included in a joint box or an intermediate connection structure should be increased and thus a whole size of the joint box or intermediate connection structure may increase.

Recently, use of a flexible intermediate connection structure (hereinafter referred to as a "flexible joint") in the field of submarine cables and the like is increasing.

The flexible joint refers to a connection structure that has an outer diameter substantially the same as that of a cable and is bendable freely, rather than a general joint box.

When submarine power cables are connected through a general joint box, the submarine cables cannot be wound around a turntable of a ship for cable installation or the like because the joint box is large in volume and is not flexible and thus should be intermediately connected in the ship in units of unit lengths and thereafter laid at the sea bottom, thereby significantly increasing time and costs.

However, when the flexible joint or the like is applied, an outer diameter and flexibility thereof are similar to those of cables to be connected and thus the cables connected to each other may be laid by continuously winding them around a turntable of a ship for laying submarine cables.

Although it is assumed that the outer diameter of the flexible joint is not significantly different from those of cables, when the conductor sleeve 212 of the related art is applied as described above, the thickness of a reinforcing insulating layer increases, thus causing an increase in the thickness of the flexible joint, when the thickness of the conductor sleeve 21 is increased to secure the current supply path P of the conductor sleeve 212.

SUMMARY

The present disclosure relates to an intermediate connection structure of a power cable. More specifically, the present disclosure is directed to providing an intermediate connection structure of a power cable, which is capable of reducing heating of an interface between conductors of a pair of power cables connected through a joint box, enhancing a connected state of the conductors, and minimizing a diameter of the conductor connection part.

The present disclosure provides an intermediate connection structure of a power cable for connecting a pair of power cables, wherein the pair of power cables comprise: conductors, inner semiconducting layers surrounding the conductors, cable insulating layers surrounding the inner semiconducting layers, and outer semiconducting layers surrounding the cable insulating layers, wherein the pair of power cables are disposed in the intermediate connection structure such that ends of the conductors face each other, and the ends of the conductors comprise multiple steps, the diameters of which decrease toward a center in a step-wise manner, and the intermediate connection structure comprises a conductor sleeve configured to compress the conductors of the pair of power cables and having multiple steps on an inner circumferential surface, wherein an inner diameter of the multiple steps decreases inwards according to a shape of the ends of the conductors.

And a length of the multiple steps of each of the conductor sleeve and the conductors may increase inwards.

And a height of a step-difference portion in a boundary area between the multiple steps of each of the conductor sleeve and the conductors may increase inwards.

And the present disclosure provides an intermediate connection structure of a power cable for connecting a pair of power cables, wherein the pair of power cables comprise: conductors, inner semiconducting layers surrounding the conductors, cable insulating layers surrounding the inner semiconducting layers, and outer semiconducting layers surrounding the cable insulating layers, wherein the pair of power cables are disposed in the intermediate connection structure such that ends of the conductors face each other, and the ends of the conductors comprise multiple steps, the diameters of which decrease toward a center in a step-wise manner, and the intermediate connection structure comprises a conductor sleeve configured to compress the conductors of the pair of power cables and having multiple steps and a partition wall on an inner circumferential surface, wherein an inner diameter of the multiple steps decreases inwards according to a shape of the ends of the conductors, and the partition wall is provided at a center.

And each of the conductor sleeve and the conductors may have two or three step-difference portions, thus forming three or four steps.

And among the multiple steps of each of the conductive sleeve and the conducts, a length of a step between an innermost step and an outermost step may be greater than lengths of the innermost step and the outermost step.

And the length of the innermost step may be greater than that of the outermost step.

And a thickness of the partition wall may be less than the length of the outermost step.

And a length of at least one of the multiple steps of the conductor before the conductor is inserted into the conductor sleeve may be less than that of a corresponding step of the conductor sleeve.

And the multiple steps of the conductor sleeve and the multiple steps of the conductor may be formed in shapes to be combined with each other when compressed, thereby minimizing an empty space.

And the conductor sleeve may comprise a pair of peaks at locations, which are spaced apart from each other in a longitudinal direction, on an outer circumferential surface; and a valley between the pair of peaks.

And the valley of the conductor sleeve may be provided outside a partition wall located in a boundary area between the ends of the conductors inserted into the conductor sleeve.

And a reinforcing insulating layer, an outer semiconducting restoration layer, and a metal sheath restoration layer may be sequentially provided outside the conductor sleeve of the intermediate connection structure.

And each of the conductors of the power cables comprises a central wire and multiple flat wires covering the central wire, and the multiple steps of each of the conductors may be formed by stripping flat wires in each layer.

And the conductor sleeve may be divided into a plurality of overlapping sleeve members.

And the conductor sleeve may comprises a first sleeve member having a pipe shape; and a second sleeve member having a pipe shape and mounted outside the first sleeve member.

And the partition wall may be provided at a center of the first sleeve member.

And the intermediate connection structure may further comprise a third sleeve having a pipe shape and mounted outside the second sleeve member.

And an insulating coating layer may be added to an entire or part of an inner circumferential surface or an outer circumferential surface of at least one of the plurality of sleeve members of the conductor sleeve.

And the insulating coating layer may comprise an enamel coating layer.

And at least one protruding rib may protrude from an inner circumferential surface of the conductor sleeve toward a center of the conductor sleeve in a circumferential direction.

And at least one ring-shaped protruding rib may be provided in a circumferential direction on an entire or part of an inner circumferential surface or an outer circumferential surface of at least one of the overlapping sleeve members of the conductor sleeve.

And Abrasive machining may be performed on an entire or part of an inner circumferential surface or an outer circumferential surface of at least one of the overlapping sleeve members of the conductor sleeve so as to increase a degree of surface roughness.

And the present disclosure provides an intermediate connection structure of a power cable for connecting a pair of power cables, wherein the pair of power cables comprise: conductors, inner semiconducting layers surrounding the conductors, cable insulating layers surrounding the inner semiconducting layers, and outer semiconducting layers surrounding the cable insulating layers, wherein the pair of power cables are disposed in the intermediate connection structure such that ends of the conductors face each other, and the ends of the conductors comprise multiple steps, the diameters of which decrease toward a center in a step-wise manner, and the intermediate connection structure comprises a conductor sleeve configured to compress the conductors of the pair of power cables and having multiple steps on an inner circumferential surface, wherein an inner diameter of the multiple steps decreases inwards in a step-wise manner according to a shape of the ends of the conductors of the power cables, and the conductor sleeve is divided into a plurality of overlapping pipe-shaped sleeve members.

And the conductor sleeve may comprise a first sleeve member having a pipe shape at a center and a second sleeve member having a pipe shape and mounted outside the first sleeve member.

And the intermediate connection structure may further comprise a third sleeve having a pipe shape and mounted outside the second sleeve member.

And the intermediate connection structure may further comprise a partition wall provided at a center of the first sleeve member.

And each of the conductor sleeve and the conductors may have two or three step-difference portions, thus forming three or four steps.

And among the multiple steps of each of the conductive sleeve and the conductors, a length of a step between an innermost step and an outermost step may be greater than lengths of the innermost step and the outermost step.

And the length of the innermost step may be greater than that of the outermost step.

And a thickness of the partition wall may be less than a length of an outermost step among the multiple steps of the conductor sleeve and the conductors.

And a length of at least one of the multiple steps of the conductor before the conductors may be inserted into the conductor sleeve is less than that of a corresponding step of the conductor sleeve.

And the conductor sleeve may comprise a pair of peaks at locations, which are spaced apart from each other in a longitudinal direction, on an outer circumferential surface; and a valley between the pair of peaks.

And the valley of the conductor sleeve may be provided on an outer side of a boundary area between the ends of the conductors inserted into the conductor sleeve.

And a reinforcing insulating layer, an outer semiconducting restoration layer, and a metal sheath restoration layer may be sequentially provided outside the conductor sleeve of the intermediate connection structure.

And each of the conductors of the power cables may comprise a central wire and multiple flat wires covering the central wire, and the multiple steps of each of the conductors is formed by stripping flat wires of each layer.

And an insulating coating layer may be added to an entire or part of an inner circumferential surface or an outer circumferential surface of at least one of the plurality of sleeve members of the conductor sleeve.

And the insulating coating layer may comprise an enamel coating layer.

And at least one ring-shaped protruding rib may be provided in a circumferential direction on an entire or part of an inner circumferential surface or an outer circumferential surface of at least one of the overlapping sleeve members of the conductor sleeve.

In an intermediate connection structure of a power cable according to the present disclosure, heating of an interface between conductors of a pair of power cables connected through a joint box can be reduced and a thickness of a reinforcing intermediate connection structure or the like can be minimized.

In the intermediate connection structure of a power cable according to the present disclosure, connection reliability of an interface between the conductors of the pair of power cables connected through the joint box can be improved.

In addition, in the intermediate connection structure of a power cable according to the present disclosure, thicknesses of a conductor connection part, the reinforcing insulating layer, etc. can be reduced and thus an outer diameter of a flexible joint may be set to be substantially the same as that of a power cable when the flexible joint is formed by reducing an outer diameter of an intermediate connection structure.

BRIEF DESCRIPTION OF THE DRAWINGS

FIG. 22 is a cross-sectional view of a conductor connection part of a power cable of the related art.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

In general, cables impregnated with insulating oil are connected through a joint box at intervals of several hundreds of meters or several kilometers and the ends thereof are connected to an overhead line through the joint box. First, a power cable 100 impregnated with insulating oil and an intermediate connection structure of the power cable 100 for connection of power cables will be described below.

Figure 1:
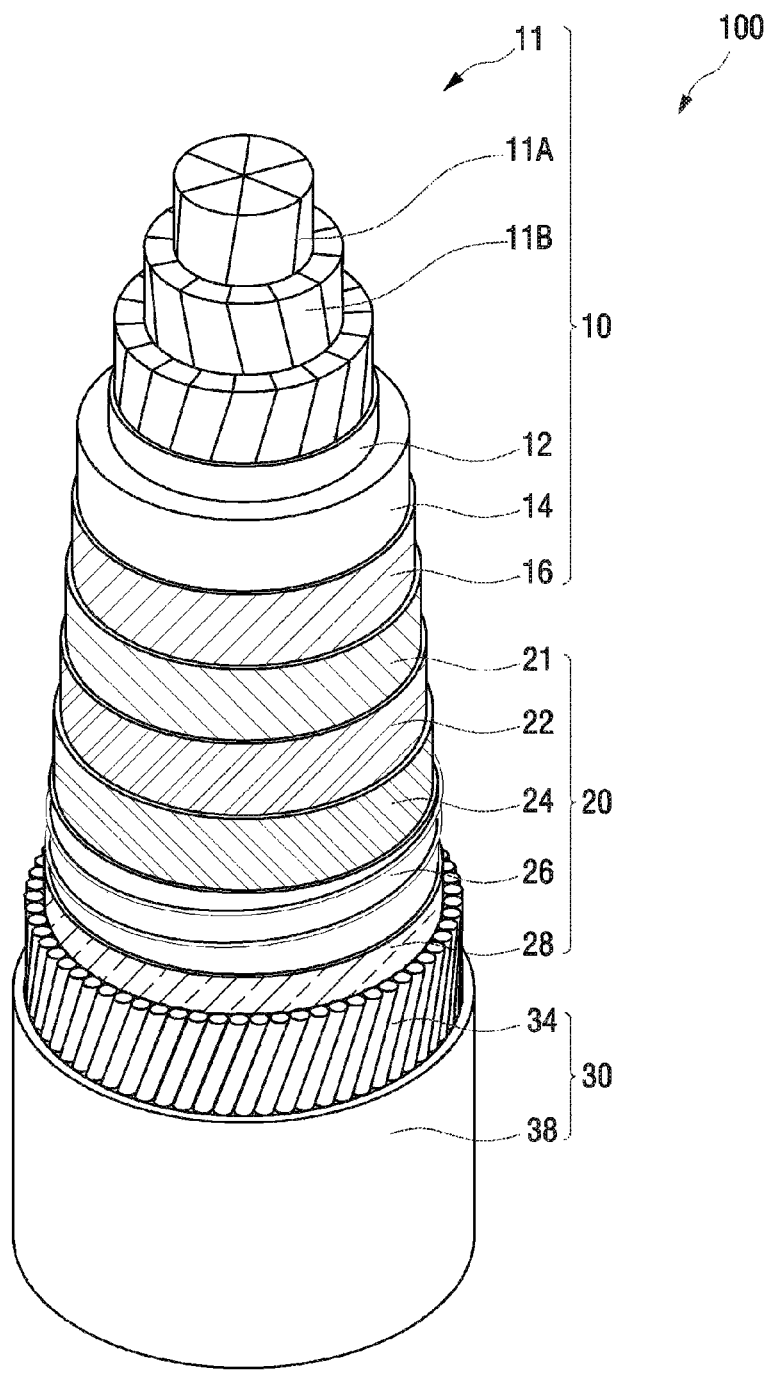
FIG. 1 is a cutaway perspective view of a submarine power cable to be connected using an intermediate connection structure of a power cable according to the present disclosure.

FIG. 1 is a cutaway perspective view of a submarine power cable 100 which is an example of a power cable.

Referring to FIG. 1, the submarine power cable 100 includes a cable core part 10 having a conductor 11, an inner semiconducting layer 12, a cable insulating layer 14, and an outer semiconducting layer 16, and configured to transmit power along the conductor 11 only in a longitudinal direction of the submarine power cable 100 and prevent leakage of current in a radial direction of the submarine power cable 100.

The conductor 11 acts as a path through which current flows to transmit power, and may be formed of a material, e.g., copper or aluminum, which has high conductivity to minimize power loss and has strength and flexibility appropriate to manufacture and use a cable.

As illustrated in FIG. 1, the conductor 11 may be a flat conductor 11 including a flat wire layer 11c consisting of a round central wire 11a and a flat wire 11b twisted to cover the round central line 11a, and having an overall round cross section. As another example, the conductor 11 may be a circular compressed conductor 11 obtained by twisting a plurality of round wires and compressing them into a circular shape. The flat conductor 11 has a higher space factor than that of the circular compressed conductor 11 and thus may contribute to reduction of an outer diameter of a cable.

Because the conductor 11 is formed by twisting a plurality of wires, a surface thereof is not smooth and thus an electric field may not be uniform and a corona discharge is likely to occur locally. When there is a gap between the surface of the conductor 11 and the cable insulating layer 14 described below, insulation performance may decrease.

In order to solve this problem, the inner semiconducting layer 12 may be provided outside the conductor 11. The inner semiconducting layer 12 may include an insulating material to which conductive particles such as carbon black, carbon nanotubes, carbon nanoplates, or graphite are added and thus may have a semiconductive property.

The inner semiconducting layer 12 may prevent a sudden change in an electric field between the conductor 11 and the cable insulating layer 14 described below, thereby stabilizing insulation performance. In addition, the inner semiconducting layer 12 may suppress a non-uniform charge distribution on a surface of the conductor 11 to achieve a uniform electric field, and prevent a gap between the conductor 11 and the cable insulating layer 14 to suppress a corona discharge, dielectric breakdown, etc.

The cable insulating layer 14 is provided outside the inner semiconducting layer 12 to electrically insulate the inner semiconducting layer 12 from the outside so that current flowing through the conductor 11 may not leak to the outside.

The cable insulating layer 14 may include insulating paper impregnated with insulating oil. That is, the cable insulating layer 14 may be formed by winding insulating paper in multiple layers to surround the inner semiconducting layer 12 and impregnating the insulating paper with insulating oil after the cable core part 10 is formed. As the insulating oil is absorbed by the insulating paper, insulating characteristics of the cable insulating layer 14 may be improved.

The insulating oil improves insulating characteristics when gaps in the insulating paper and gaps between layers generated by winding the insulating paper are filled with the insulating oil, and reduces a frictional force between the layers of the insulating paper when the power cable 100 is bent, thereby improving bendability of the power cable 100.

When low-viscosity insulating oil having relatively low viscosity is used, it is necessary to pressurize the insulating oil using oiling facility or the like to maintain a state in which the insulating paper is impregnated with the insulating oil and prevent gaps in the cable insulating layer 14 due to the flow of the insulating oil. However, when insulating oil having medium or high viscosity is used, a flow rate of the insulating oil is low and thus oiling facility is not needed to pressurize the insulating oil or the number of pieces of oiling facility may be reduced to increase a length of a cable to be extended. For example, at least one selected from the group consisting of naphthenic insulating oil, polystyrene insulating oil, mineral oil, alkyl benzene or polybutene synthetic oil, heavy alkylate, and the like may be used as the insulating oil.

The insulating paper may be Kraft paper obtained by removing organic electrolyte in Kraft pulp or composite insulating paper obtained by adhering Kraft paper onto one side or both sides of a plastic film.

Specifically, the cable insulating layer 14 may be formed by winding only Kraft paper and impregnating the Kraft paper with insulating oil. In this case, the insulating oil may flow in a direction in which load is applied to the power cable 100, thereby causing gaps. On the other hand, when the cable insulating layer 14 is formed by winding composite insulating paper and impregnating the composite insulating paper with the insulating oil, thermoplastic resin such as polypropylene resin is not impregnated with the insulating oil and may thermally expand according to an impregnation temperature during the manufacture of a cable or an operating temperature during an operation of the cable. When the thermoplastic resin thermally expands, surface pressure is applied to a plurality of pieces of stacked Kraft paper, thus reducing a flow path of the insulating oil, and therefore, the insulating oil may be suppressed from flowing due to gravity or contraction/expansion of the insulating oil. In addition, the composite insulating paper has higher dielectric strength than that of Kraft paper and thus contribute to a reduction of an outer diameter of a cable.

When electric current is supplied to the power cable 100, the conductor 11 serving as a path through which the electric current flows is heated and the temperature thereof gradually reduces from an inner side thereof to an outer side thereof in the radial direction of the power cable 100, thereby causing a temperature difference in the cable insulating layer 14. Therefore, the insulating oil in the cable insulating layer 14 right above the conductor 11, i.e., on the inner semiconducting layer 12, reduces in viscosity and thermally expands and thus moves outwards. When a temperature of the power cable 100 reduces, the viscosity of the moving insulating oil increases and does not return to an original state and thus a gap may occur in a portion of the cable insulating layer 14 right above the conductor 11.

The outer semiconducting layer 16 may be provided outside the cable insulating layer 14. Similar to the inner semiconducting layer 12, the outer semiconducting layer 16 is formed of a material having a semiconductive property, e.g., an insulating material to which conductive particles such as carbon black, carbon nanotubes, carbon nanoplates, or graphite are added, to suppress a non-uniform charge distribution between the cable insulating layer 14 and the metal sheath 22 described below, thereby stabilizing insulation performance. In addition, the outer semiconducting layer 16 may planarize a surface of the cable insulating layer 14 to mitigate electric field concentration in the power cable 100, thus preventing a corona discharge, and physically protect the cable insulating layer 214.

The cable core part 10 may further include a moisture absorbing layer 21 to prevent moisture from penetrating the power cable 100. The moisture absorbing layer 21 may be provided between the twisted wires of the conductor 11 and/or outside the conductor 11, and provided in the form of powder, a tape, a coating layer, or a film containing a super absorbent polymer (SAP) capable of quickly absorbing moisture permeating the power cable 100 and maintaining a state of absorbing the moisture, thereby preventing permeation of moisture in a longitudinal direction of the power cable 100. In addition, the moisture absorbing layer 21 may have semiconductivity to prevent a sudden electric field change.

A cable protection part 20 may be provided outside the cable core part 10, and the power cable 100 may further include a cable outer cover part 30 when laid at the bottom of the sea. The cable protection part 20 and the cable armor 30 protect the cable core part 10 from various environmental factors, such as moisture penetration, mechanical trauma, and corrosion, which may affect power transmission performance of the power cable 100.

The cable protection part 20 includes the metal sheath 22 and a polymer sheath 24 to protect the power cable 100 from fault current, external forces, and other external environmental factors.

The metal sheath 22 may be provided to surround the cable core part 10. In particular, when the power cable 100 is laid in an environment such as the sea bottom, the cable core part 10 may be sealed to prevent the permeation of foreign substances such as moisture thereinto, and a molten metal may be extruded on the outside of the cable core part 10 to make the cable core part 10 have seamless and continuous outer sides, thereby enhancing watertightness performance. The molten metal may be lead or aluminum, preferably, lead having excellent corrosion resistance to seawater when the power cable 100 is laid at the sea bottom, and more preferably, a lead alloy containing a metal element to reinforce mechanical properties. The metal sheath 22 may be grounded at an end of the power cable 100 to serve as a path through which fault current flows when an accident such as a ground fault or a short circuit occurs, protect the power cable 100 from external shocks, and prevent an electric field from being discharged to the outside of the power cable 100.

Furthermore, an anticorrosion compound, e.g., blown asphalt, may be applied onto a surface of the metal sheath 22 to additionally improve corrosion resistance, watertightness, etc. of the power cable 100 and improve adhesion to the polymer sheath 24.

Furthermore, a nonwoven copper wire tape and a moisture absorbing layer 21 may be additionally provided between the metal sheath 22 and the cable core part 10. The nonwoven copper wire tape includes copper wire, a nonwoven tape, and the like to facilitate electrical contact between the outer semiconducting layer 16 and the metal sheath 22. The moisture absorbing layer 21 is provided in the form of powder, a tape, a coating layer, a film or the like containing a super absorbent polymer (SAP) capable of quickly absorbing moisture permeating the power cable 100 and maintaining a state of absorbing the moisture to prevent penetration of moisture in the longitudinal direction of the power cable 100. In addition, the nonwoven copper wire tape and the moisture absorbing layer 21 may preferably have a semiconductive property to prevent a sudden change in an electric field, and the moisture absorbing layer 21 may include copper wire to be supplied with electric current and to absorb moisture.

The polymer sheath 24 may be provided outside the metal sheath 22 to improve corrosion resistance, watertightness, etc. of the power cable 100 and protect the power cable 100 from other external environmental factors such as mechanical trauma, heat, and ultraviolet rays. The polymer sheath 24 may be formed of a resin such as polyvinyl chloride (PVC) or polyethylene, and preferably, polyethylene resin having excellent watertightness when the power cable 100 is laid at the sea bottom and preferably, polyvinyl chloride (PVC) resin in an environment requiring flame retardancy.

The power cable 100 may include a metal strip layer 26 outside the polymer sheath 24 in the form of a galvanized steel tape or the like to prevent expansion of the metal sheath 22 due to expansion of the insulating oil. A bedding layer (not shown) formed of a semiconductive non-woven tape or the like may be provided on and/or below the metal strip layer 26 to buffer an external force applied to the power cable 100, and an outer sheath 28 formed of a resin such as polyvinyl chloride or polyethylene may be further provided to significantly improve corrosion resistance, watertightness, etc. of the power cable 100 and additionally protect the power cable 100 from other external environmental factors such as mechanical trauma, heat, ultraviolet rays, etc.

The power cable 100, when laid at the sea bottom, is likely to be damaged by the anchor of a ship, a bending force applied due to sea currents or waves, friction with the sea bottom, etc., and thus may further include the cable armor 30 outside the cable protection part 20 to prevent this problem.

The cable armor 30 may include a metal reinforcing layer 34 and a serving layer 38. The metal reinforcing layer 34 may be formed of steel, galvanized steel, copper, brass, bronze, or the like, formed by cross-winding wire having a round or flat cross-section in at least one layer, enhance mechanical properties and performance of the power cable 100, and additionally protect the power cable 100 from an external force.

The serving layer 38 formed of polypropylene yarn or the like may be provided in one or more layers on and/or below the metal reinforcing layer 34 to protect the power cable 100. The serving layer 38, which is an outermost layer, may be formed of two or more materials of different colors to secure visibility of the power cable 100 laid at the sea bottom.

Figure 2:
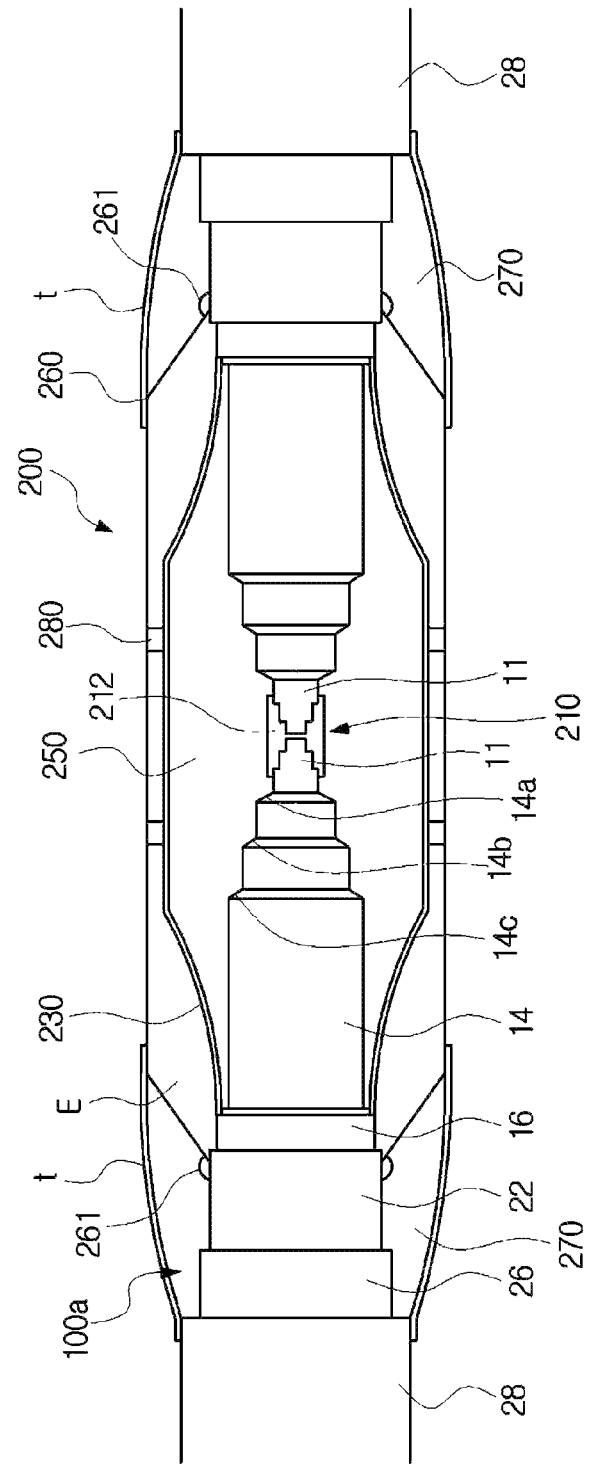
FIGS. 2 and 3 are cross-sectional views of examples of an intermediate connection structure of a power cable according to the present disclosure.
Figure 3:
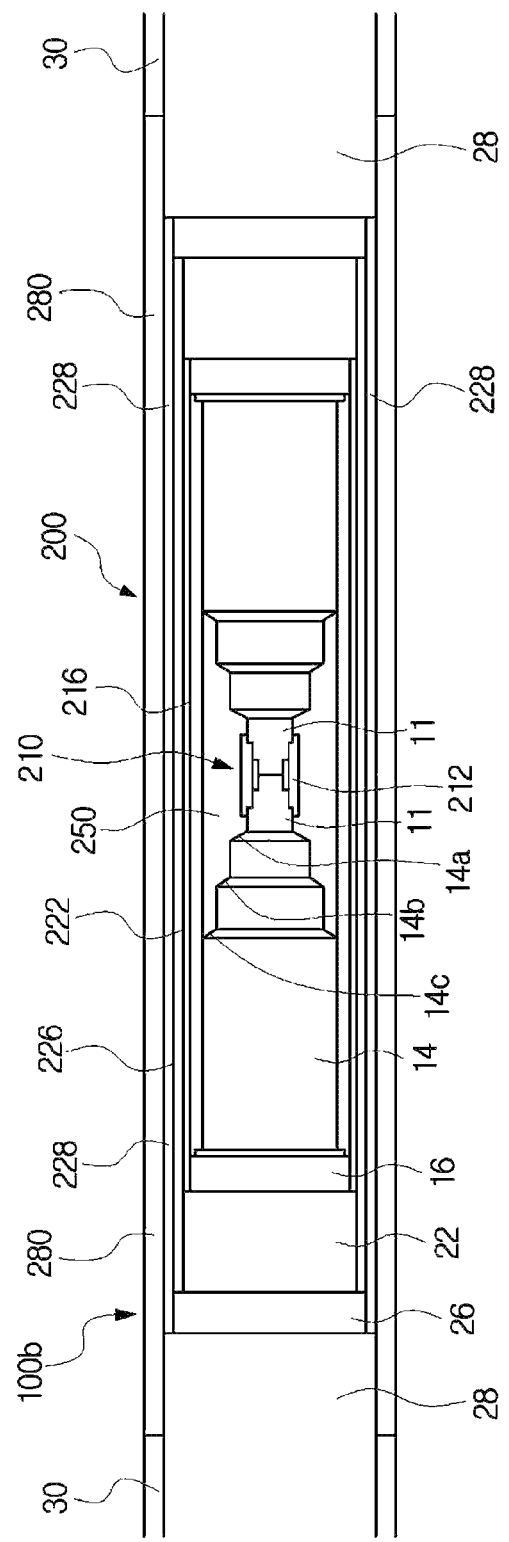

FIGS. 2 and 3 are cross-sectional views of examples of an intermediate connection structure 200 of a power cable according to the present disclosure.

An intermediate connection structure 200 of FIG. 2 is embodied as a joint box, and an intermediate connection structure 200 of FIG. 3 is embodied as a flexible joint.

Referring to FIG. 2, the intermediate connection structure 200 according to the present disclosure is provided to connect a pair of power cables; the power cables each may include a conductor 11, an inner semiconducting layer (not shown) surrounding the conductor 11, a cable insulating layer 14 surrounding the inner semiconducting layer, and an outer semiconducting layer 16 surrounding the cable insulating layer 14; in the intermediate connection structure 200, ends of the conductors 11 are disposed to face each other and diameters thereof include multiple steps and decrease toward centers in a step-wise manner; and the intermediate connection structure 200 may include a conductor sleeve 212 onto which the conductors 11 of the pair of power cables are compressed and the inner circumferential surface of which include multiple steps, the inner diameter of which decrease inwards in the step-wise manner according to a shape of the ends of the conductors 11.

A conductor connection part 210 for connecting the conductors 11 may be configured to electrically and mechanically connect a pair of the exposed conductors 11, and the pair of conductors 11 are compressed when being inserted into the conductor sleeve 212.

The conductor sleeve 212 of the intermediate connection structure 200 of the power cable 100 and the conductor 11 of the power cable 100 according to the present disclosure may have a multi-step structure to mitigate problems due to heat which may be generated when a cross-sectional area of a current supply path decreases.

Specifically, the diameters of the conductors 11 of the pair of power cables may decrease toward centers in the step-wise manner and an inner diameter of an inner circumferential surface of the conductor sleeve 212 may decrease inwards in the step-wise manner according to a shape of ends of the conductors 11, i.e., a thickness of the conductor sleeve 212 may increase inwards in a radial direction.

That is, the conductor sleeve 212 and the conductor 11 may have at least one stepped structure to be combined and assembled together, when the conductor 11 is inserted into the conductor sleeve 212, and may be compressed in a combined state.

The conductor sleeve 212 and the conductor 11 may each include a stepped structure, wherein vertical sides of step-difference portions of the stepped structure are likely to be separated during a compression process and thus a thickness of each of the step-difference portions is preferably minimized. Therefore, at least two step-difference portions may be provided to form three or four steps.

As described above with reference to FIG. 1, the conductor 11 of each of the pair of power cables connected through the intermediate connection structure 200 of the present disclosure may include a flat wire layer consisting of a round central wire and flat wires twisted to cover the round central wire, and the stepped structure of each of the conductor 11 and the conductor sleeve 212 may be configured, as boundaries, with respect to the central wire and the flat wires of each layer of the conductor 11 of the power cable of FIG. 1.

That is, as shown in FIG. 1, the central wire and the flat wires of each layer form two step-difference portions st1 and st2, thus forming three steps, and thus, multiple steps of the conductor 11 may be formed by stripping flat wires of each layer at multiple stages and inner multiple steps of the conductor sleeve 212 may be formed according to the shape of the conductor 11 of the power cable, thereby improving workability of a conductor step generation process.

The object and effects of this structure will be described below.

As shown in FIG. 2, when the pair of the conductors 11 are connected using the conductor sleeve 212, the conductor sleeve 212 may be a same diameter conductor sleeve 212, the outer diameter of which becomes substantially the same as that of the pair of conductors 11, when compressed, and an outer side of the conductor sleeve 212 may be compressed after the conductor sleeve 212 is inserted into ends of the pair of the exposed conductors 11.

A thickness of the reinforcing insulating layer 250 described below may be reduced when the conductor sleeve 212 is embodied as a radial conductor sleeve having an outer diameter substantially the same as those of the pair of conductors 11. Particularly, when a flexible joint illustrated in FIG. 3 or the like is configured, a total outer diameter of the intermediate connection structure 200 may be substantially the same as the outer diameter of the power cable 100 when the reinforcing insulating layer 250 of the intermediate connection structure 200 is configured to have the same outer diameter as that of an insulating layer of the power cable 100.

The exposed cable insulating layer 14 of the power cable 100 is penciled to have multi-step inclined surfaces as illustrated in FIG. 2 but may be penciled to have a single inclined surface.

After the conductors 11 are connected through the conductor sleeve 212, the reinforcing insulating layer 250 surrounding the conductor connection part 210 and the cable insulating layers 14 may be formed to allow current flowing through the conductors 11 and the conductor connection part 210 to flow only in a longitudinal direction of the intermediate connection structure 200 and to prevent the current from leaking in a radial direction.

The reinforcing insulating layer 250 may be formed by winding insulating paper to surround the conductor connection part 210 and the exposed inner semiconducting layers or the cable insulating layers, and the insulating paper used to form the reinforcing insulating layer 250 may be composite insulating paper having excellent dielectric strength.

In the embodiment of FIG. 2, an outer semiconducting layer 230 may be provided outside the reinforcing insulating layer 250 as in the power cables 100a.

An insulating-oil-filled space E may be provided outside the outer semiconducting layer 230 and a protective copper tube 260 for protecting the cable connecting part 200 may be provided. The protective copper tube 260 may protect the inside of the joint box from the outside, be electrically connected to the metal sheath 22 of the power cable 100, and serve as a fault current path.

The intermediate connection structure 200 may further include a leaded part 261 at an interface between the metal sheath 22 of the cable and the protective copper tube 260.

The metal sheath 22 may be formed of a material such as a lead sheath, and the leaded part 261 may be formed by soldering a boundary area between the metal sheath 22 and the protective copper tube 260 using a torch or the like.

A spacer 280 may be provided to maintain a gap between the protective copper tube 260 and the reinforcing insulating layer 250. The spacer 280 may be formed of a metal material.

A epoxy molding layer 270 may be provided on an outer side of the leaded part 261, and the outer side of the epoxy molding layer 270 may be finished through a heat shrinkable tube t.

In the embodiment of FIG. 2, the protective copper tube 260 is configured as a housing structure and thus the intermediate connection structure 200 of the power cable 100a of FIG. 2 may be configured as a joint box.

The insulation performance of the intermediate connection structure 200 should be ensured by injecting insulating oil thereinto. Specifically, when a space E between the reinforcing insulating layer 250 and the protective copper tube 260 is filled with the insulating oil, and particularly, when the reinforcing insulating layer 50 is provided by winding paper impregnated half with oil, the reinforcing insulating layer 250 should be impregnated with the insulating oil to improve insulation performance.

The protective copper tube 260 of the present disclosure may include an intake pipe (not shown) and a discharge pipe (not shown) of the insulating oil. The intake pipe and the discharge pipe are provided on an outer side of the protective copper tube 260 in opposite directions and serve as a moving path of the insulating oil.

As described above, because the intermediate connection structure 200 of the power cable 100b of FIG. 2 is in the form of a joint box and thus is not flexible, a pair of power cable 100b cannot be wound around a drum or a turntable when they are connected to each other and thus may be individually wound around the drum or the turntable and thereafter connected at a connection site through the intermediate connection structure 200 which is in the form of a joint box.

FIG. 3 is a cross-sectional view of an intermediate connection structure 200 of a power cable 100 according to an embodiment of the present disclosure. A description of parts that are the same as those of FIG. 2 will be omitted here.

As described above, an intermediate connection structure 200 of FIG. 3 may be in the form of flexible joint having a diameter and flexibility that are substantially the same as those of power cables to be connected.

Similar to the embodiment of FIG. 2, the intermediate connection structure 200 of the power cable 100b of FIG. 3 may include the intermediate connection structure for connecting a pair of power cables 100b, in the intermediate connection structure 200, the diameters of the conductors 11 of the pair of power cables 110b decrease toward centers in a step-wise manner, an inner circumferential surface of the conductor sleeve 212 decreases inwards in the step-wise manner according to a shape of the end of the conductor 11, and the conductor sleeve 212 and the conductor 11 may each have a stepped structure to be combined with each other when the conductor 11 is inserted into the conductor sleeve 212, and may be compressed in a combined state.

The conductor sleeve 212 of the intermediate connection structure 200 of FIG. 3 is divided into sleeve members of an overlapping pipe structure. The conductor sleeve 12 will be described in detail below.

The intermediate connection structure 200 of the embodiment of FIG. 3 is configured as a flexible joint that has an outer diameter substantially the same as that of a cable and is flexible, unlike the intermediate connection structure 200 of FIG. 2.

Similarly, in the intermediate connection structure 200 of FIG. 3, which is in the form of flexible joint, after the conductors 11 are connected through the conductor sleeve 212, the reinforcing insulating layer 250 surrounding the conductor connection part 210 and the cable insulating layer 14 may be formed to allow current flowing through the conductor 11 and the conductor connection part 210 to flow only in the longitudinal direction of the intermediate connection structure 200 and prevent the current from leaking in a radial direction, and may be formed by winding insulating paper to surround the conductor connection part 210, the exposed inner semiconducting layer and the cable insulating layer 14.

However, the embodiment of FIG. 3 is different from the embodiment of FIG. 2, in that an outer diameter of the reinforcing insulating layer 250 is configured to be the same as that of the cable insulating layer 14 of the power cable 100b.

An outer semiconducting restoration layer 216, a metal sheath restoration layer 222, a metal strip restoration layer 226, and the like may be sequentially disposed outside the reinforcing insulating layer 250 of the intermediate connection structure 200 of the intermediate connection structure 200 of FIG. 3, similar to the structure of a cable.

Each layer or sheath to be restored may be configured to correspond to a structure, a material, and an outer diameter of each layer of the cable. The outer semiconducting restoration layer 216 to be restored may be disposed in a taping manner, and the metal sheath restoration layer 222 may be disposed using a lead sheath tube by a tube reduction method.

A sheath restoration layer 228, an armor restoration layer 280, and the like may be further disposed outside the metal strip restoration layer 226 according to a type of a power cable. The armor restoration layer 280 may be added when a power cable is a submarine power cable as shown in FIG. 1.

In this way, the intermediate connection structure 200 of FIG. 3 may have an outer diameter substantially the same as those of the power cables 100 to be connected, a housing structure such as the protective copper tube 260 may be omitted, a configuration and material of each layer are the same as those of the power cables 100 to be connected, thus achieving flexibility, and therefore, the power cables 100 connected at a factory may be wound around a bobbin, a turntable of a ship for laying submarine cables, or the like, and a cable connection process performed at an installation site of the power cables 100 may be omitted, thereby significantly reducing cable installation costs.

FIGS. 4 to 9 are cross-sectional views of various embodiments of a conductor sleeve 212 of an intermediate connection structure 200 of a power cable according to the present disclosure.

Figure 4:
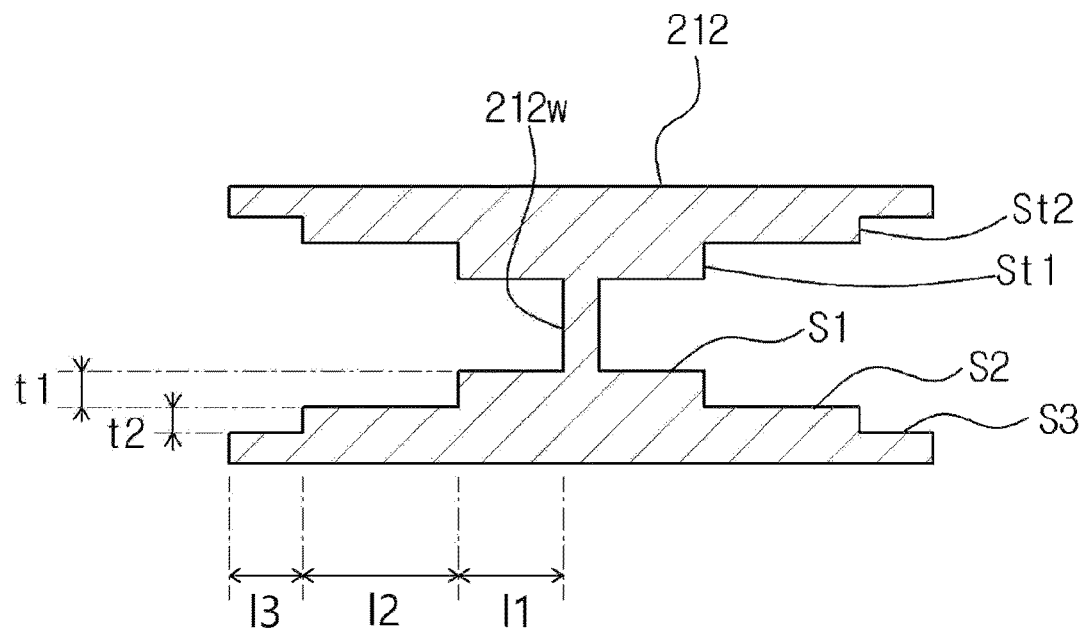
FIGS. 4 to 9 are cross-sectional views of various embodiments of a conductor sleeve of an intermediate connection structure of a power cable according to the present disclosure.

FIG. 4 illustrates a conductor sleeve 212 including multiple steps, the inner diameter of which decreases inwards in a step-wise manner according to a shape of ends of power cables to be connected and a partition wall 212w disposed on a center.

A conductor compressed into the conductor sleeve 212 of FIG. 4 includes three steps s1, s2, and s3 with two step-difference portions st1 and st2.

Therefore, the conductor sleeve 212 of FIG. 3 may have a first step-difference portion st1 and a second step-difference portion st2 and thus have a stepped structure with a first step s1, a second step s2, and a third step s3.

It is preferable that heights of the first and second step-difference portions st1 and st2 should increase inwards and a length of a step between an innermost step and an outermost step among the multiple steps should be greater than lengths of the innermost step and the outermost step.

Because a step of the conductor compressed by the innermost step of the conductor sleeve 212 has a small diameter and thus a depth of compression is not relatively large and the outermost step of the conductor sleeve 212 has a relatively small thickness in a circumferential direction and thus the amount of compression is not large, a length of a step between the innermost step and the outermost step may be set to be relatively long, thereby increasing an effect of actual conductor compression.

Thus, in the embodiment of FIG. 4, it is preferable that the second step s2 among the first step s1, the second step s2, and the third step s3 of the conductor sleeve 212 should be longest.

A fixing force of the conductor compressed on the innermost step of the conductor sleeve 212 may be higher than that of the conductor compressed on the outermost step of the conductor sleeve 212. That is, because a thickness of the innermost step of the conductor sleeve 212 is greater in the circumferential direction than that of the outermost step thereof, a depth of compression into a region of the innermost step may be greater than a depth of compression into a region of the outermost step and the fixing force of the conductor in the region of the innermost step may be larger, and thus, the innermost step is preferably determined to be longer than the outermost step.

Therefore, in the embodiment of FIG. 4, because the thickness of the first step s1 of the conductor sleeve 212 in the circumferential direction thickness is greater than that of the third step s3, the depth of compression into the region of the first step s1 may be greater than that of compression into the region of the third step s3 and a fixing force of the conductor in the region of the first step s1 may be larger, and thus, a length l1 of the first step s1 is preferably greater than a length l3 of the third step s3.

In conclusion, in the embodiment of FIG. 4, the lengths l1, l2, and l3 of the first, second and third steps s1, s2, and s3 may be in the magnitude order of the second s2, the first step s1, and the third step s3, and the first step-difference portion st1 may be greater than the second step-difference portion st2.

A partition wall 212w may be provided at a center of the conductor sleeve 212.

The partition wall 212w may be in contact with an end of each conductor to secure a current supply path in a longitudinal direction and block a flow of insulating oil.

When the partition wall 212w is not provided, when the conductor sleeve 212 is compressed after conductors are inserted into both ends thereof, sides of end regions of the conductors are likely to be separated, whereas when the partition wall 212w is provided inside the conductor sleeve 212, the partition wall 212w is also compressed during the compression of the conductor sleeve 12, thus maintaining electrical connection of both ends of the conductors, and therefore, a current supply path (from the sides of the end regions of the conductors, the partition wall 212w, and to the sides of the end regions of the conductors) may be achieved, thereby significantly preventing heating of a conductor connection part.

Generally, insulating oil is managed in units of sections with respect to a termination connection box, a joint box, or the like as a boundary, thus the exchange of oil through the intermediate connection structure 200 of connected power cables is not preferable and the power cable 212w may block movement of the insulating oil through the conductors of the power cables.

A thickness of the partition wall 212w may be less than a length of an outermost step, which is a shortest step, among multiple steps of the conductor sleeve 212.

In addition, a length of at least one step among the multiple steps of the conductors before the conductors are inserted into the conductor sleeve 212 and compressed may be set to be less than that of a corresponding step of the conductor sleeve 212, by taking into consideration a possibility that the conductor sleeve 212 may be pushed during compression thereof.

For example, a length of the first step s1 of the conductor sleeve 212 and a length of the first step of the conductor may be set to be the same to ensure contact with the partition wall 212w, and the second or third step s3 of the conductor may be set to be shorter than the second or third step.

Figure 5:
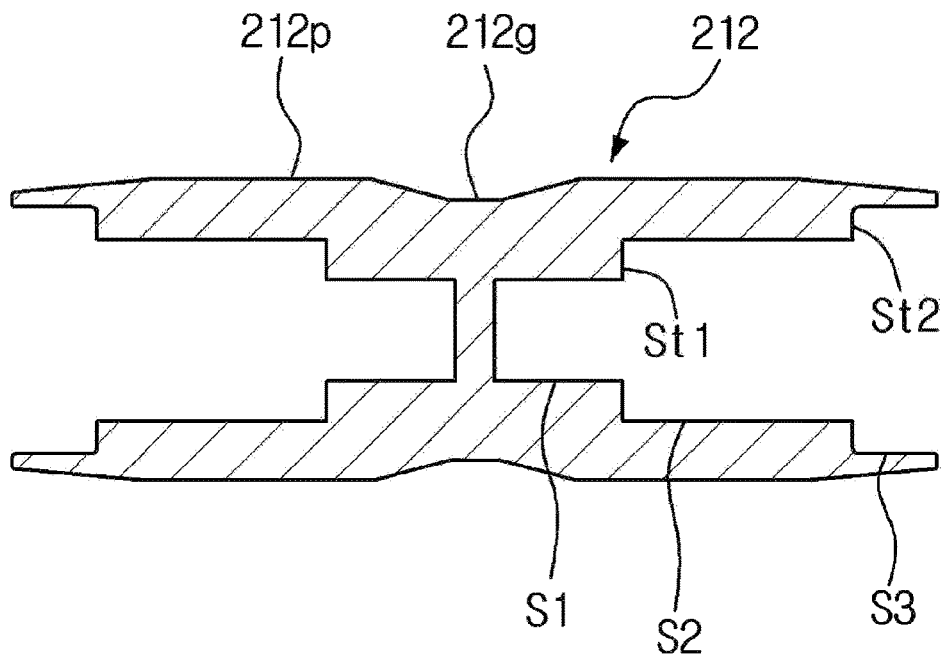

Similarly, the embodiment of FIG. 5 relates to a conductor sleeve 212, which includes multiple steps and a partition wall 212w at a center as an inner diameter decreases inwards in the step-wise manner according to a shape of ends of conductors of connected power cables and into which the ends of the conductors of the power cables are inserted and compressed a plurality of times in an assembled state. A description of parts that are the same as those of FIG. 4 will be omitted here.

Unlike the conductor sleeve 212 of FIG. 4, the conductor sleeve 212 of FIG. 5 further includes peaks 212p and a valley 212g on an outer circumferential surface thereof.

When the conductor sleeve 212 is configured by forming the peaks 212p and the valley 212g on the outer circumferential surface, a contact area and tensile strength against tension applied in a longitudinal direction of a cable may be increased.

Figure 9:
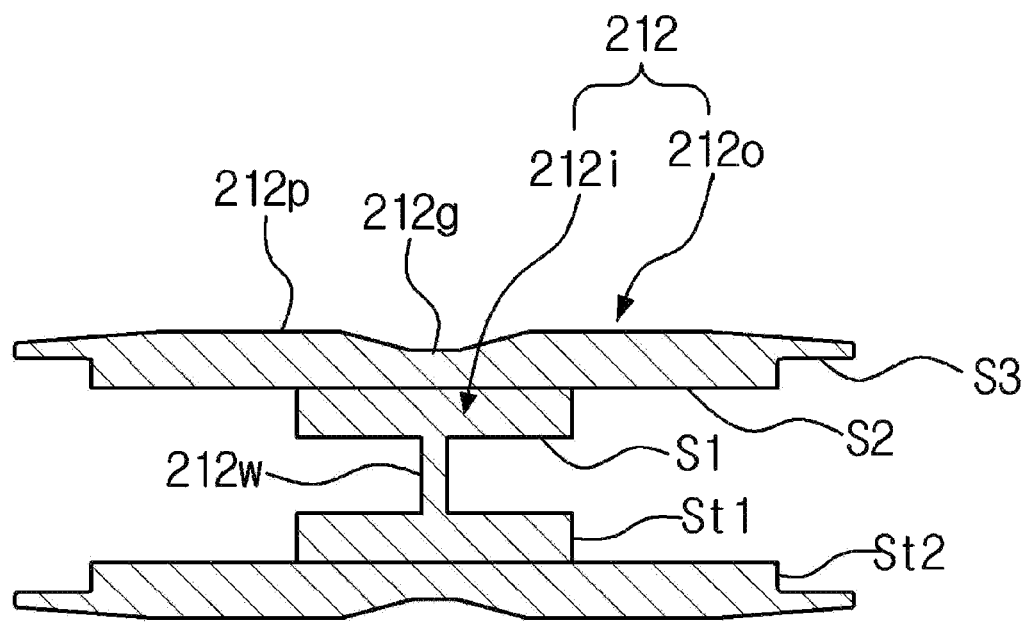

Therefore, when as shown in FIG. 4, when the conductors of the pair of power cables are inserted and compressed into both ends of the conductor sleeve 212 including the peaks 212p and the valley 212g between the peaks 212p on the outer circumferential surface, a height difference between the peaks 212p and the valley 212g on the outer circumferential surface of the conductor sleeve 212 may be eliminated, and in the embodiment of FIG. 9, step-difference portions 212s of a conductive sleeve 212 corresponding to positions of peaks may be deformed into a form clamping an outer circumferential surface of a conductor 11.

The valley 212g of the conductor sleeve 212 may be provided in a boundary area between the conductors 11 of the connected power cables 100, i.e., outside a partition wall 212w. By providing steps of the inner circumferential surfaces of the conductors 11 and the conductor sleeve 212 in a bent form rather than a parallel form, a contact length or area between the conductor 11 and the conductor sleeve 212 may be increased and tensile strength against tension applied in the longitudinal direction of the conductors 11 may be improved.

Figure 6:
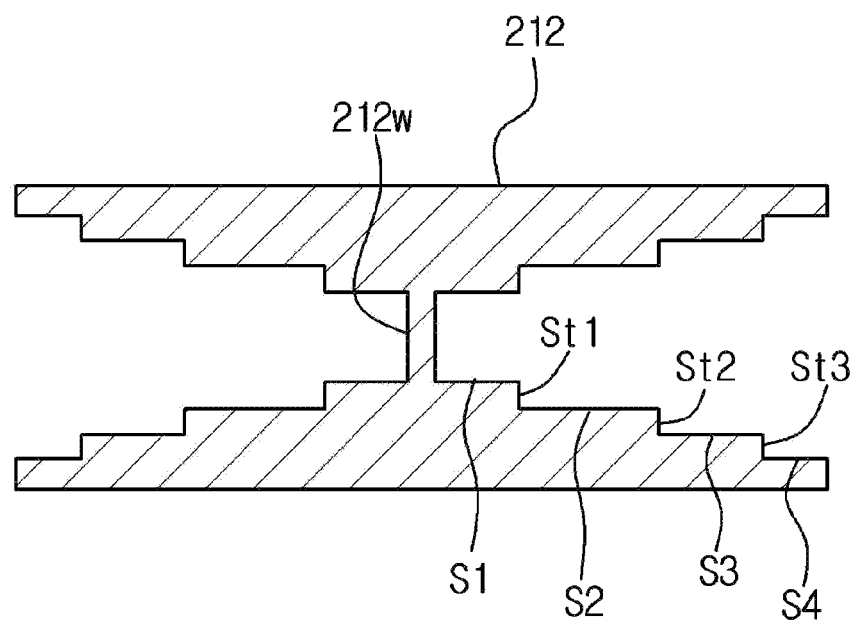

Similarly, the embodiment of FIG. 6 relates to a conductor sleeve 212, which includes multiple steps and a partition wall 212w at a center as an inner diameter decreases inwards in the step-wise manner according to a shape of ends of conductors of connected power cables and into which the ends of the conductors of the power cables are inserted and compressed a plurality of times in an assembled state. A description of parts that are the same as those of FIGS. 4 and 5 will be omitted here.

A diameter of the conductor or the conductor sleeve 212 may vary according to the capacity of the power cables, and the number of steps or step-difference portions may be determined as needed. Therefore, the conductor sleeve 212 of FIG. 6 may include a first step-difference portion st1, a second step-difference portion st2, and a third step-difference portion st3, thus forming a first step s1, a second step s2, a third step s3, and a fourth step s4 in a stepped structure in the conductor sleeve 212.

Likewise, the second and third steps s2 and s3 may be set to be longer than the first or fourth step s1 or s4, and even when four steps are provided in the conductor sleeve 212, a clamping effect may be achieved during compression of the conductor second 212 by providing a valley and peaks an outer circumferential surface of the conductor sleeve 212.

Figure 7:
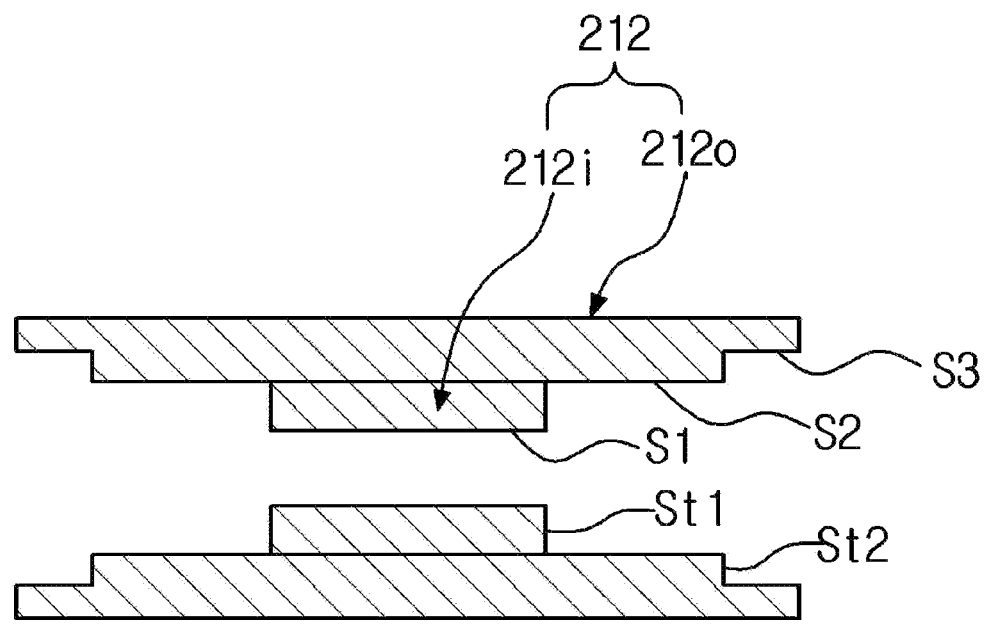

A conductor sleeve 212 of FIG. 7 is the same as those of the previous embodiments, in that the conductor sleeve 212 is a pipe-shaped conductor sleeve that includes multiple steps as an inner diameter decreases inwards in the step-wise manner according to a shape of ends of conductors of connected power cables and is configured to compress the ends of the conductors of the power cables, which are inserted into and assembled with both ends of the conductor sleeve 212, a plurality of times. However, in the embodiment of FIG. 7, the conductor sleeve 212 is divided into several pieces.

The conductor sleeves 212 described above with reference to FIGS. 4 to 6 are configured in the form of a whole conductor and thus a thickness of a central portion thereof increases when current is supplied thereto after connection with conductors of power cables and therefore is less heated than the conductor sleeve 212 of FIG. 22, but current may be concentrated on a surface thereof when the current is supplied thereto due to the skin effect and thus the conductor sleeve 212 may be divided into several pieces to reduce the amount of heat generated due to the skin effect.

The conductor sleeve 212 of FIG. 7 may be divided into a first sleeve member 212i having a pipe shape and a second sleeve member 212o mounted outside the first sleeve member 212i.

Because the second sleeve member 212o provided outside the first sleeve member 212i forms two steps having a step-difference portion, three steps may be provided inside the conductor sleeve 212 through two sleeve members.

Alternatively, in order to form two step-difference portions st1 and st2 and three steps inside the sleeve member 212, the conductor sleeve 212 may be divided into a first sleeve member to a third sleeve member with respect to step-difference portions without forming a step-difference portion on the second sleeve member 212o.

It was confirmed that when the conductor sleeve 212 was divided into a first sleeve member 212i and a second sleeve member 212o that are in the form of overlapping pipes as illustrated in FIG. 7 and were compressed, an inner circumferential surface of the first sleeve member 212i and an outer circumferential surface of the second sleeve member 212o come into close contact with each other, but there may be a fine clearance therebetween and thus the amount of current supplied to opposite steps of conductors and a step of the conductor sleeve 212 in a radial direction may decrease and the supply of current through step-difference surfaces (sides) of the conductors and the conductor sleeve 212 may be guided to increase the amount of current supplied to the conductor sleeve 212 in a longitudinal direction, lessen the skin effect, and minimize the amount of heat to be generated.

Unlike a conductor sleeve having a partition wall at a center, in the embodiment of FIG. 7, two conductor installation spaces may communicate with each other with respect to a central portion, a first step s1, a second step s1, and a third step s3 may be provided in each of the conductor installation spaces, a depth of compression and a fixing force may be greatest at the first step s1 having a greatest third in a radial direction of a conductor sleeve, and thus, a length 11 of an innermost step is preferably set to be greatest and a length l3 of an outermost step is preferably set to be smallest (l1>l2>l3).

In order to mitigate the skin effect of current, an insulation coating layer may be added to an inner or outer circumferential surface of at least one of a plurality of sleeve members of the conductor sleeve 212. An enamel coating layer may be applied as an example of the insulation coating layer.

Regions to which the insulation coating layer is added is limited to an entire or part of the inner circumferential surface of the conductor sleeve 212 or an entire of part of the outer circumferential surfaces of the conductors, excluding step-difference surfaces of the conductors and the conductor sleeve 212.

When the insulation coating layer is added to an inner circumferential surface of a step of the conductor sleeve 212 or outer circumferential surfaces of steps of the conductors, the flow of current to an interface between the compressed conductors in the radial direction may be blocked and guided to a step-difference portion (side) of each of the conductor and the conductor sleeve 212, thereby significantly reducing heat generated due to the skin effect of supplied current.

Figure 8:
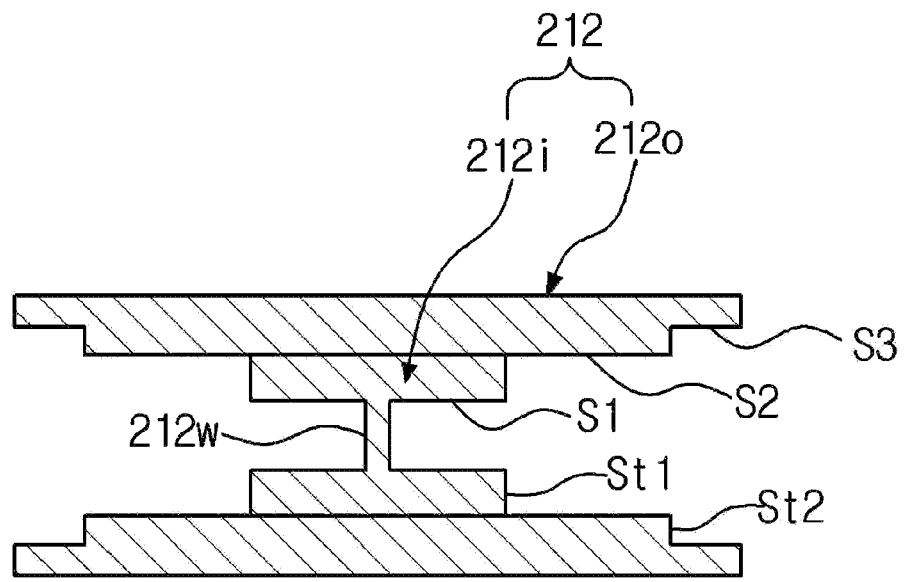

Embodiments of FIGS. 8 and 9 are the same as the embodiment of FIG. 7, in that a conductor sleeve 212 includes multiple steps, is in the form of a pipe configured to be compressed a plurality of times when ends of conductors of a pair of power cables are inserted into and assembled with the conductor sleeve 212, and includes a first sleeve member 212i having a pipe shape and a second sleeve member 212o having a pipe shape and mounted outside the first sleeve member 212i.

However, the embodiments of FIGS. 8 and 9 is different from the embodiment of FIG. 7, in that a partition wall 212w is provided at a center of the conductor sleeve 212, similar to the embodiments of FIGS. 4 to 6.

In the embodiments of FIGS. 8 and 9, the conductor sleeve 212 may include the first sleeve member 212i and the second sleeve member 212o, and the partition wall 212w may be included in the first sleeve member 212i. The embodiments of FIGS. 8 and 9 are the same as the embodiments of FIGS. 4 and 5, except that the conductor sleeve 212 is divided into the first sleeve member 212i and the second sleeve member 212o, and thus, a description thereof will be omitted here.

In addition, as described above, the number of steps and step-difference portions included in each of the conductor sleeve 212 and the conductors may be determined by a dimeter of conductors of a pair of power cables connected through the conductor sleeve 212 and the like, and the conductor sleeve 212 may be configured to have four or more steps and the number of sleeve members to be divided from the conductor sleeve 212 may increase in this case, unlike in the embodiments of FIGS. 4 and 5.

Figure 10:
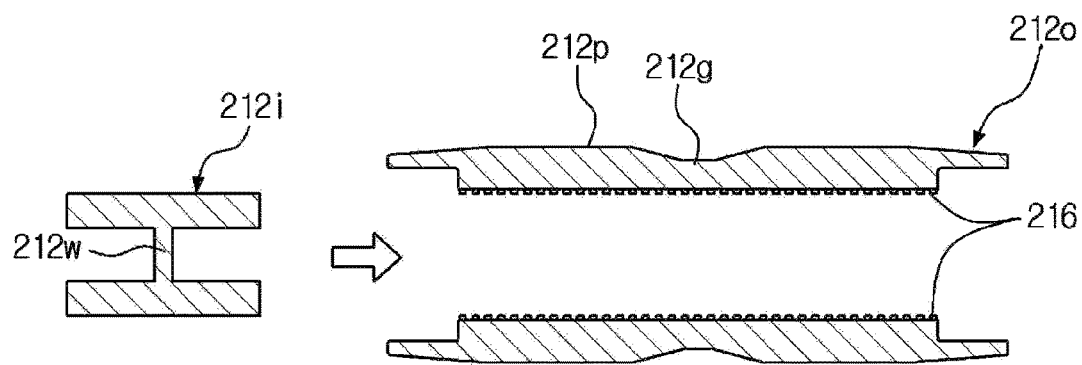
FIGS. 10 and 11 illustrate a manufacturing method of a conductor sleeve of an intermediate connection structure of a power cable according to the present disclosure.
Figure 11:
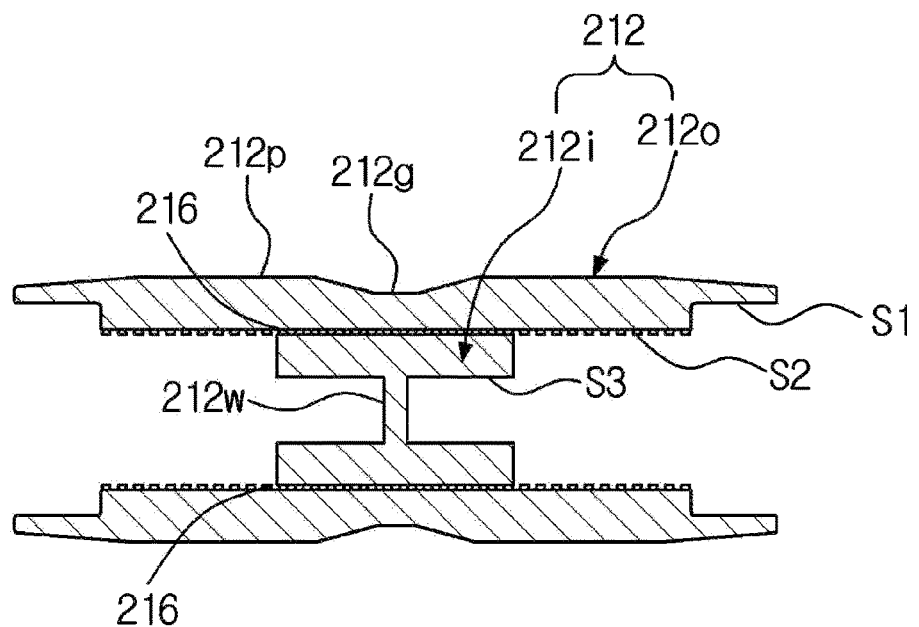

FIGS. 10 and 11 illustrate a conductor sleeve 212 of an intermediate connection structure 200 of a power cable according to another embodiment of the present disclosure.

A basic structure of the conductor sleeve 212 of FIGS. 10 and 11 is the same as that of the conductor sleeve 212 of FIG. 9.

Similarly, the conductor sleeve 212 of FIGS. 10 and 11 may be divided into two first sleeve members 212i and a second sleeve member 212o, and may be assembled by inserting the first sleeve members 212i into the second sleeve member 212O as illustrated in FIG. 10.

When the conductor sleeve 212 is divided into several sleeve members, the sleeve members may be separated when tension is applied after compression is completed.

Therefore, a plurality of protruding ribs 216 may be provided on at least one surface among outer circumferential surfaces of the first sleeves 212i, which are internal components of the conductor sleeve 212, or an inner circumferential surface of the second sleeve 212o in a circumferential direction. The embodiment of FIGS. 10 and 11 is an example in which a plurality of protruding ribs 216 are provided on the inner circumferential surface of the second sleeve member 212O in the circumferential direction.

As shown in FIG. 11, when there may be a clearance in the outer circumferential surface of the first sleeve member 212i or the inner circumferential surface of the second sleeve member 212o in an assembled state of the conductor sleeve 212 due to the protruding ribs 216, the protruding ribs 216 may be inserted and compressed into an opposite sleeve member when the compression is completed, thereby minimizing the clearance.

Therefore, the protruding ribs 216 may function as stopping protrusions on a contact surface between the first sleeve members 212i and the second sleeve member 212o of the conductor sleeve on which the compression of the conductors is completed, thereby increasing tensile strength.

In the embodiment of FIG. 11, because protrusions are provided on the entire outer circumferential surface of the first sleeve members 212i of the conductor sleeve 212, not only adhesion of the contact surface between these sleeve members may be improved but also adhesion between the second step of the conductor sleeve 212 and the second step of the conductor may be improved.

In the embodiments of FIGS. 10 and 11, the protruding ribs 216 are provided on the inner circumferential surface of the second member 212o, but may be also provided on the outer circumferential surfaces of the first sleeve members 212i or the inner circumferential surface of the first sleeve members 212i into which the conductors are inserted, thereby improving tensile strength in a connected state of the conductors.

Alternatively, the protruding ribs 216 for improving tensile strength may be replaced by abrasive machining performed to increase surface roughness.

Figure 12:
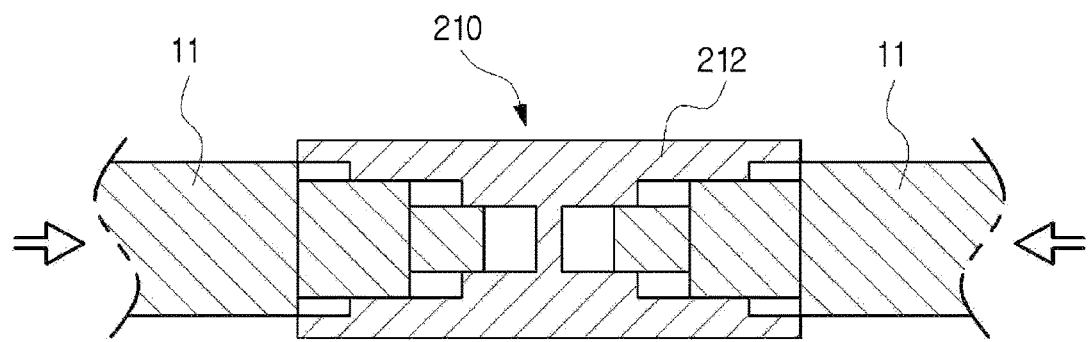
FIGS. 12 to 14 illustrate an example of a conductor connection process using an intermediate connection structure of a power cable according to an embodiment of the present disclosure.
Figure 13:
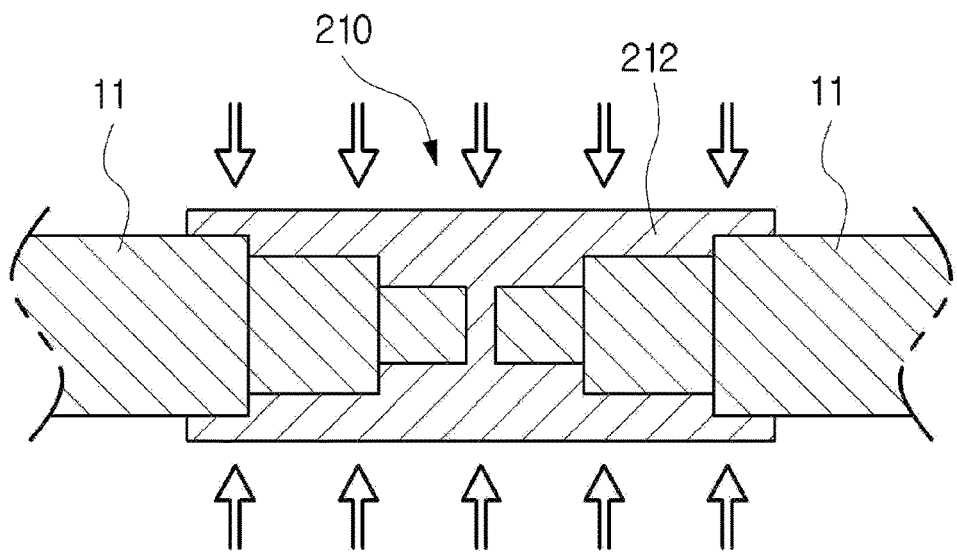
Figure 14:
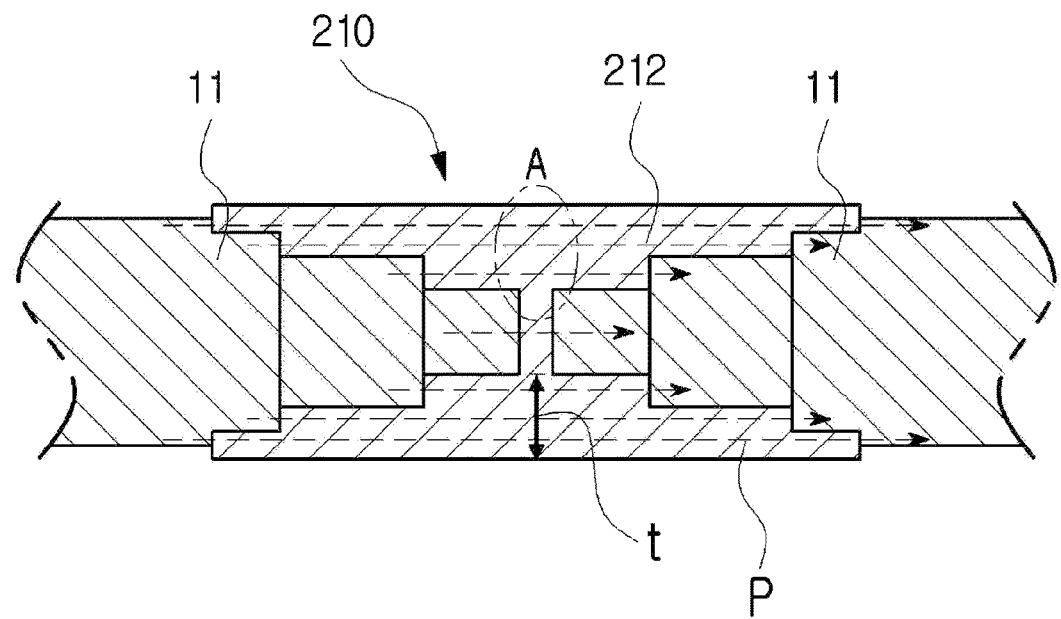

FIGS. 12 to 14 illustrate an example of a conductor connection process using an intermediate connection structure 200 of a power cable according to an embodiment of the present disclosure.

As described above, diameters of conductors 11 of a pair of power cables 100 connected through the intermediate connection structure 200 of the power cable 100 according to the present disclosure may decrease toward a center in the step-wise manner, and a diameter of an inner circumferential surface of a conductor sleeve 212 may decrease inwards in the step-wise manner according to a shape of ends of the conductors 11. That is, the multiple steps of the conductor sleeve 212 and the conductors 11 may be configured in forms to be combined with each other when compressed, thereby minimizing an empty space.

An outer circumferential surface of the conductor sleeve 212 of FIGS. 12 to 14 has a circular pipe shape but the conductor sleeve 212 may have an inner structure, the inner diameter of which sequentially decreases toward a center in the step-wise manner and a partition wall 212w may be provided at the center.

Therefore, as shown in FIG. 12, the conductor sleeve 212 and the conductors 11 may be combined and assembled together while the conductors 11 are inserted into both ends of the conductor sleeve 212 as illustrated in FIG. 13, and may be compressed a plurality of times in the combined state. The conductor sleeve 212 may be compressed through compression dies (not shown). In this case, an outer diameter of the conductor sleeve 212 may be sequentially reduced by alternately using a compression die having a circular inner circumferential surface and a compression die having a hexagonal inner circumferential surface.

Then, after the compression, the outer diameter of the conductor sleeve 212 may be reduced to minimize the difference between the outer diameter of the conductor sleeve 212 and the outer diameter of the conductor 11 as illustrated in FIG. 14.

That is, during the compression, gaps in the conductors 11 and a thickness of the conductor sleeve 212 may be reduced and thus a deviation between the outer diameter of the compressed conductor sleeve 212 and the outer diameter of the conductors 11 in a region other than a conductor connection part 210 may be minimized.

When the deviation between the outer diameter and the outer diameter of the conductor 11 in the region other than the conductor connection part 210 is minimized, a deviation between a thickness of the reinforcing insulating layer 250 (see FIG. 3) outside the conductor sleeve 212 and a thickness of the insulating layer 14 of the power cable (see FIG. 14) may be minimum, thereby achieving a same diameter (almost same diameter) intermediate connection structure 200, in which the difference between an outer diameter thereof and an outer diameter of the power cable is minimized.

Thus, in the embodiment of FIG. 14, a total outer diameter of the conductor sleeve 212 into which the conductors 11 compressed through the compression process are inserted reduces and thus may form an almost same diameter with the outer diameters of the conductors 11 of the power cable 100, and the outer circumferential surfaces of the conductors 11 inserted into the conductor sleeve 212 and the inner circumferential surface of the conductor sleeve 212 are in close contact with one another, thereby improving current supply reliability.

As described above, opposite cross sections of the conductors 11 inserted into the conductor sleeve 212 may be separated from each other when a pressing force is applied thereto during the compression and it is almost impossible to bring the opposite cross sections into surface contact with each other due to the accuracy of a process of cutting the conductors 11, but the partition wall 212w is provided and compressed together and thus electrical conductivity may be improved through the ends of the conductors 11.

Unlike in the related art, the diameters of the conductors 11 of the pair of power cables of the present disclosure decrease toward the center in the step-wise manner and the diameter of the inner circumferential surface of the conductor sleeve 212 decreases inwards in the step-wise manner according to the shape of the ends of the conductors 11, and therefore, a thickness t of the conductor sleeve 212 having a pipe shape increases such that a diameter is smallest at the center, i.e., in the boundary area A between the conductors 11, and a portion having a largest thickness of the conductor sleeve 212 may be used as a current supply path P.

Furthermore, the inner circumferential surface of each step of the conductor sleeve 212 and the outer circumferential surfaces of the steps of the conductors 11 inserted into the conductor sleeve 212 are insulation-coated, current may be supplied through step-difference portions of the steps rather than the outer or inner circumferential surface of each step, thereby minimizing the skin effect of the conductor sleeve 212 and allowing the current to be supplied to an entire inner region of the conductor sleeve 212.

That is, as compared to FIG. 22, the conductor sleeve 212 shown in FIGS. 12 to 14 is capable of increasing a thickness of a region to be supplied with current in the boundary area between the conductors 11 and inducing a current supply path to be formed between the conductors 11 and the conductor sleeve 212 and in a longitudinal direction of the conductor sleeve 212, thereby improving electrical conductivity and solving problems due to generation of heat.

Figure 15:
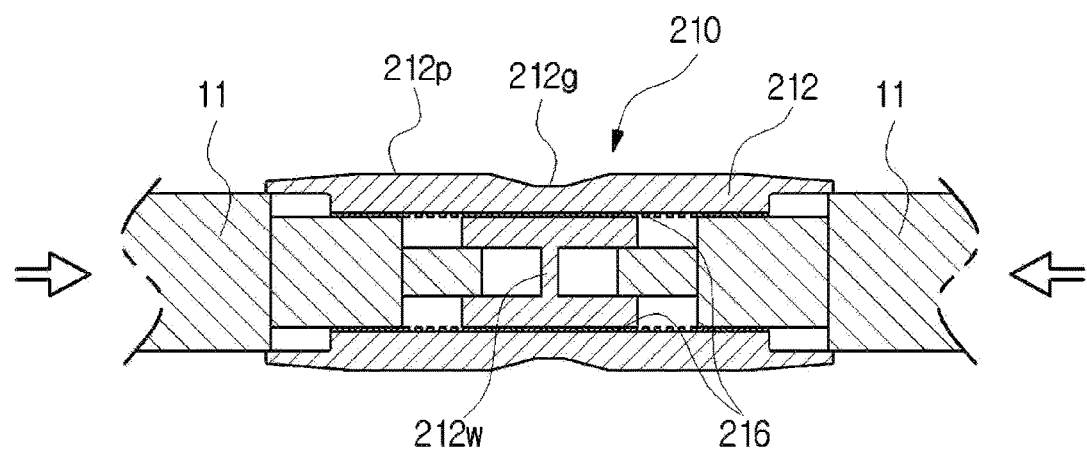
FIGS. 15 to 17 illustrate an example of a conductor connection process using an intermediate connection structure of a power cable according to another embodiment of the present disclosure.
Figure 16:
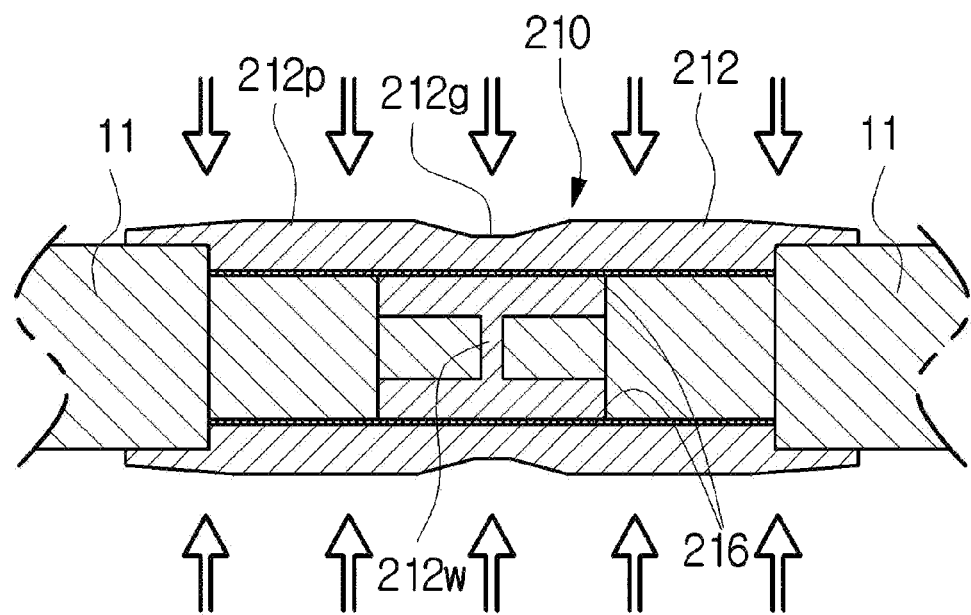
Figure 17:
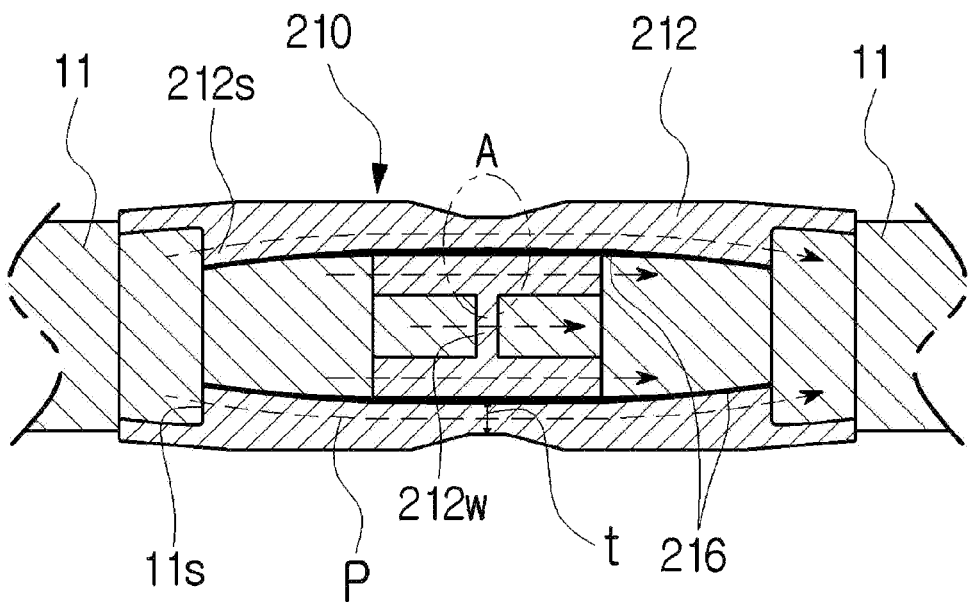

FIGS. 15 to 17 illustrate an example of a conductor connection process performed using an intermediate connection structure 200 of a power cable according to another embodiment of the present disclosure.

FIGS. 15 to 17 illustrate another example of a conductor connection process performed in an intermediate connection device of a power cable 100 according to another embodiment of the present disclosure. A description of parts that are the same as those of FIGS. 12 to 14 will be omitted here.

A pair of gentle peaks 212p and a valley 212g between the peaks 212p may be provided at locations spaced apart from one another in a longitudinal direction of an outer circumferential surface of a conductor sleeve 212 illustrated in FIGS. 15 to 17.

As described above, when the conductor sleeve 212 is configured by forming the peaks 212p and the valley 212g on the outer circumferential surface, a contact area and tensile strength against tension applied in a longitudinal direction of a cable may be increased.

Therefore, when as shown in FIG. 16, the conductor sleeve 212 including the peaks 212p and the valley 212g between the peaks 212p on the outer circumferential surface is compressed while conductors 11 of a pair of power cables are inserted into both ends of the conductor sleeve 212, a height difference between the peaks 212p and the valley 212g on the outer circumferential surface of the conductor sleeve 212 may be minimized or eliminated as illustrated in FIG. 17, and step-difference portions 212s of the conductive sleeve 212 of the embodiment of FIG. 17 corresponding to positions of the peaks 212p may be deformed into a form clamping the outer circumferential surface of the conductor 11.

The valley 212g of the conductor sleeve 212 may be provided outside a partition wall 212w in a boundary area between the conductors 11 of the connected power cables 100.

In the embodiments of FIGS. 15 to 17, a plurality of protruding ribs 216 are provided on an inner circumferential surface of a second sleeve member of the conductor sleeve 212 and may be inserted, when compressed, into a first sleeve member or the conductors 11, thereby forming a surface coupling structure that enhances tensile strength.

By providing step-difference portions of the inner circumferential surfaces of the conductors 11 and the conductor sleeve 212 in a bent form rather than a parallel form, a contact length or area between the conductor 11 and the conductor sleeve 212 may be increased and tensile strength against tension applied in the longitudinal direction of the conductors 11 may be significantly improved.

Similarly, in the embodiments of FIGS. 15 to 17, when an inner circumferential surface of each step of the conductor sleeve 212 and an outer circumferential surface of a step of the conductor 11 inserted into the conductor sleeve 212 are insulation-coated, current may be supplied through the step-difference portions of the conductor sleeve 212 or the conductor 11 rather than the outer or inner circumferential surface of each step thereof, thus minimizing a skin effect, and may be supplied to an entire inner region of the conductor sleeve 212, thereby preventing problems due to generation of heat.

Figure 18:
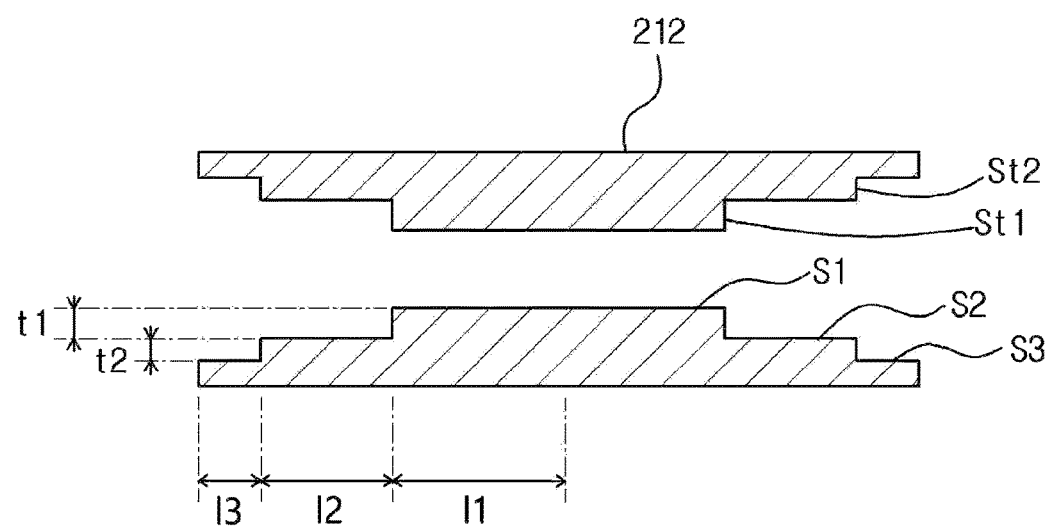
FIG. 18 is a cross-sectional view of a conductor sleeve of an intermediate connection structure of a power cable according to the present disclosure.

FIG. 18 is a cross-sectional view of a conductor sleeve of an intermediate connection structure of a power cable according to the present disclosure. A description of parts that are the same as those of the previous embodiments will be omitted here.

In the embodiment of FIG. 18, a partition wall is not provided at a center unlike in the embodiment of FIG. 4 and a conductor sleeve is configured as one member without being divided into several parts unlike in the embodiment of FIG. 7, thereby reducing costs and simplifying a structure.

Similar to the previous embodiments, a power cable intermediate connection structure according to the present disclosure may include a pipe-shaped conductor sleeve 212, which is configured to compress conductors of a pair of power cables, has multiple steps generated as an inner diameter of an inner circumferential surface thereof reduces inwards in the step-wise manner according to a shape of ends of the conductors, and compresses the ends of the conductors of the pair of power cables, which are inserted into both ends of the conductor sleeve 212, a plurality of times.

As shown in FIG. 18, lengths of the multiple steps of the conductor sleeve 12 and the conductor may increase inwards.

The embodiment of FIG. 18 is the same as the embodiment of FIG. 4, in that a first step-difference portion st1 and a second step-difference portion st2 are provided and a first step s1, a second step s2, and a third step s3 form steps together, and a height t of a step-difference portion that is a boundary area between steps of the conductor sleeve 212 and the conductor increases inwards.

However, unlike the embodiment of FIG. 4, the lengths of the multiple steps of the conductor sleeve 12 and the conductor in close contact with the conductor sleeve 212 may increase inwards or toward a central step.

The conductor sleeve 212 of FIG. 4 includes a partition wall at a center, a great effect of compression is achieved on the second step s2, which is a central part, rather than the first step s1, which is an innermost part, due to the partition wall and thus the second step s2 is set to be longest, whereas in the embodiment of FIG. 18, a depth of compression and a fixing force on the first step s1, in which a thickness of the conductor sleeve 212 in a radial direction is greatest, may be greatest and thus a length l1 of an innermost step is set to be greatest and a length l3 of an outermost step is set to be smallest (l1>l2>l3), similar to the embodiment of FIG. 7.

In the embodiment of FIG. 18, the first step s1 is not divided by a partition wall and thus regions obtained when an innermost region of the conductor sleeve 212 is divided in half may be regarded as first steps s1.

The embodiment of FIG. 18 may apply to the above-described conductor sleeves that do not include a partition wall at a center.

Figure 19:
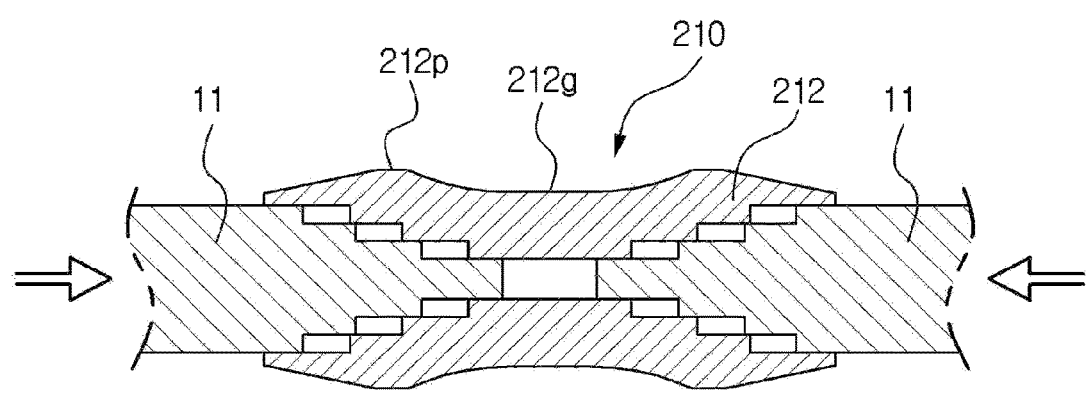
FIGS. 19 to 21 illustrate an example of a conductor connection process performed using an intermediate connection structure of a power cable according to another embodiment of the present disclosure.
Figure 20:
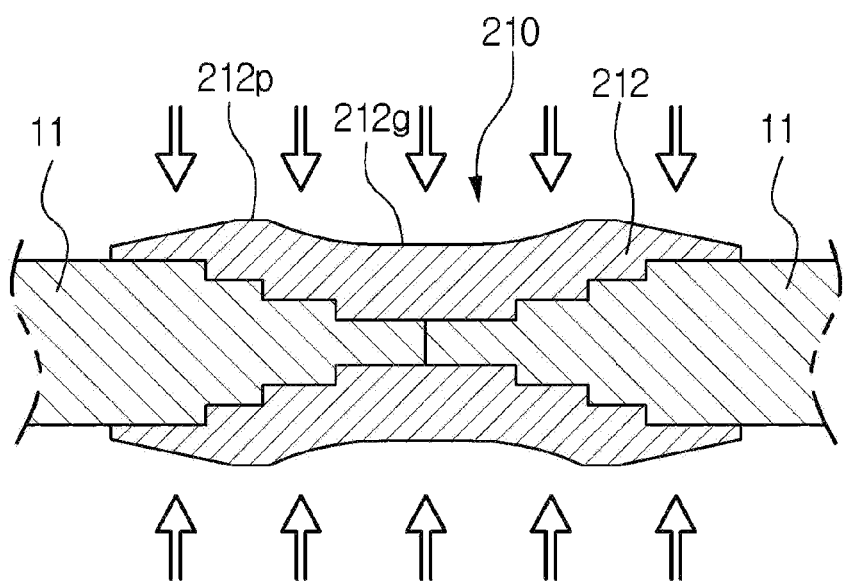
Figure 21:
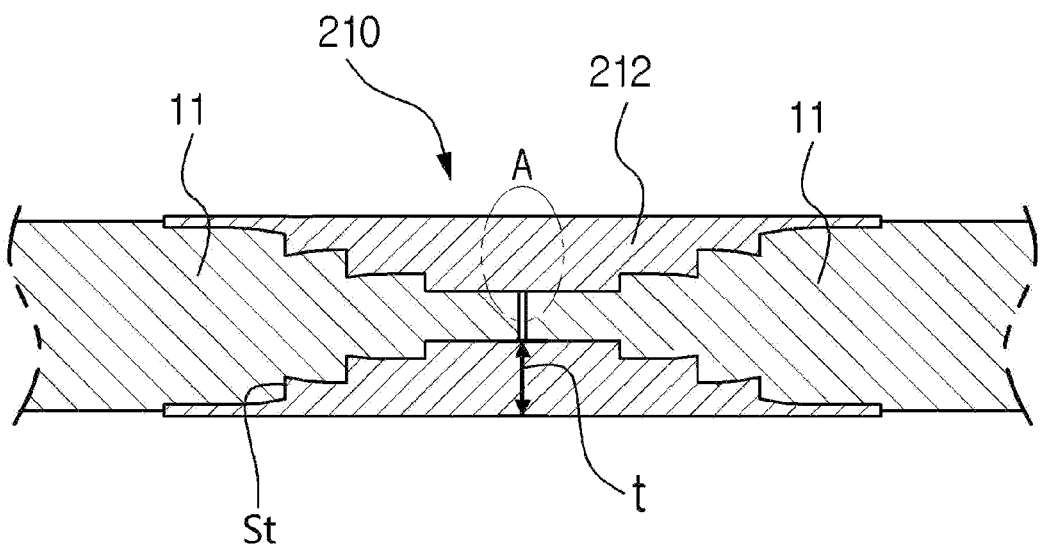

FIGS. 19 to 21 illustrate an example of a conductor connection process performed using an intermediate connection structure of a power cable according to another embodiment of the present disclosure. A description of parts that are the same as those of the previous embodiments will be omitted here.

Each of conductor sleeves 212 illustrated in FIGS. 19 to 21 is the same as that of the embodiment of FIG. 18 in that a partition wall is omitted therein but further includes peaks 212p and a valley 212g on outer circumferential surface. The peaks 212p and the valley 212g are as described above with reference to FIG. 5 or FIGS. 9 to 11.

When the conductor sleeve 212 is configured by forming the peaks 212p and the valley 212g on the outer circumferential surface, a contact area and tensile strength against tension applied in a longitudinal direction of a cable may be increased.

Therefore, when as shown in FIG. 19, the conductor sleeve 212 including the peaks 212p and the valley 212g between the peaks 212p on the outer circumferential surface is compressed while conductors 11 of a pair of power cables are inserted into both ends of the conductor sleeve 212, a height difference between the peaks 212p and the valley 212g on the outer circumferential surface of the conductor sleeve 212 may be eliminated as illustrated in FIG. 21, and the step-difference portions St of the embodiment of FIG. 9 corresponding to positions of the peaks 212p may be deformed into a form clamping the outer circumferential surface of the conductor 11.

The valley 212g of the conductor sleeve 212 may be provided in a boundary area between the conductors 11 of the connected power cables 100.

By providing step-difference portions of the inner circumferential surfaces of the conductors 11 and the conductor sleeve 212 in a bent form rather than a parallel form, a contact length or area between the conductor 11 and the conductor sleeve 212 may be increased and tensile strength against tension applied in the longitudinal direction of the conductors 11 may be improved.

A conductor connection part configured as described above may allow to secure a sufficient thickness t of the conductor sleeve 212 in a radial direction in the boundary area (region A) between the conductors 11 and to provide a sufficient conductor fixing force, as in the previous embodiments.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An intermediate connection structure for connecting a pair of power cables,
   wherein the pair of power cables comprise: conductors, inner semiconducting layers surrounding the conductors, cable insulating layers surrounding the inner semiconducting layers, and outer semiconducting layers surrounding the cable insulating layers,
   wherein the pair of power cables are disposed in the intermediate connection structure such that ends of the conductors face each other,
   wherein the ends of the conductors comprise steps, diameters of which decrease toward a center in a step-wise manner,
   wherein the intermediate connection structure comprises a conductor sleeve configured to compress the conductors of the pair of power cables, the conductor sleeve having three or more steps and a partition wall on an inner circumferential surface,
   wherein an inner diameter of the three or more steps decreases inwards according to a shape of the ends of the conductors, wherein the partition wall is provided at a center of the conductor sleeve, wherein, among respective steps of each of the conductive sleeve and the conductors, a length of a step between an innermost step and an outermost step is greater than a length of the innermost step, wherein the length of the innermost step is greater than a length of the outermost step, and wherein a length of at least one of the steps of a given conductor of the conductors, before the given conductor is inserted into the conductor sleeve, is less than that of a corresponding step of the conductor sleeve.

2. The intermediate connection structure of claim 1, wherein each of the conductor sleeve and the conductors has two or three step-difference portions, thus forming the three or four steps.

3. The intermediate connection structure of claim 1, wherein a thickness of the partition wall is less than the length of the outermost step.

4. The intermediate connection structure of claim 1, wherein the three or more steps of the conductor sleeve and the steps of the conductors are formed in shapes to be combined with each other when compressed, thereby minimizing an empty space.

5. The intermediate connection structure of claim 1, wherein the conductor sleeve comprises: a pair of peaks at locations, which are spaced apart from each other in a longitudinal direction, on an outer circumferential surface; and a valley between the pair of peaks.

6. The intermediate connection structure of claim 5, wherein the valley of the conductor sleeve is provided outside the partition wall, wherein the partition wall is located in a boundary area between the ends of the conductors inserted into the conductor sleeve.

7. The intermediate connection structure of claim 1, wherein the conductor sleeve is divided into a plurality of overlapping sleeve members.

8. The intermediate connection structure of claim 7, wherein the conductor sleeve comprises: a first sleeve member having a pipe shape; and a second sleeve member having a pipe shape and mounted outside the first sleeve member.

9. The intermediate connection structure of claim 7, wherein an insulating coating layer is added to an entire or part of an inner circumferential surface or an outer circumferential surface of at least one of the plurality of sleeve members of the conductor sleeve.

10. The intermediate connection structure of claim 1, wherein at least one protruding rib protrudes from an inner circumferential surface of the conductor sleeve toward a center of the conductor sleeve in a circumferential direction.

11. An intermediate connection structure for connecting a pair of power cables, wherein the pair of power cables comprise: conductors, inner semiconducting layers surrounding the conductors, cable insulating layers surrounding the inner semiconducting layers, and outer semiconducting layers surrounding the cable insulating layers, wherein the pair of power cables are disposed in the intermediate connection structure such that ends of the conductors face each other, wherein the ends of the conductors comprise multiple steps, diameters of which decrease toward a center in a step-wise manner, wherein the intermediate connection structure comprises a conductor sleeve configured to compress the conductors of the pair of power cables, the conductor sleeve having multiple steps on an inner circumferential surface, wherein an inner diameter of the multiple steps of the conductor sleeve decreases inwards in a step-wise manner according to a shape of the ends of the conductors of the power cables, wherein the conductor sleeve is divided into a plurality of overlapping pipe-shaped sleeve members, wherein a partition wall is provided at a center of a first sleeve member of the plurality of overlapping pipe-shaped sleeve members, wherein the conductor sleeve comprises: a pair of peaks at locations, spaced apart from each other in a longitudinal direction, on an outer circumferential surface; and a valley between the pair of peaks, wherein at least one ring-shaped protruding rib is provided in a circumferential direction on an entire or part of an inner circumferential surface or an outer circumferential surface of at least one of the plurality of overlapping pipe-shaped sleeve members.

12. The intermediate connection structure of claim 11, wherein, among the multiple steps of each of the conductive sleeve and the conductors, a length of a step between an innermost step and an outermost step is greater than a length of the innermost step and a length of the outermost step.

13. The intermediate connection structure of claim 12, wherein the length of the innermost step is greater than the length of the outermost step.

14. The intermediate connection structure of claim 11, wherein a thickness of the partition wall is less than a length of an outermost step among the multiple steps of the conductor sleeve and the conductors.

15. The intermediate connection structure of claim 11, wherein a length of at least one of the multiple steps of the conductors, before the conductors are inserted into the conductor sleeve, is less than that of a corresponding step of the conductor sleeve.

16. The intermediate connection structure of claim 11, wherein the valley of the conductor sleeve is provided on an outer side of a boundary area between the ends of the conductors inserted into the conductor sleeve.

* * * * *